United States Patent

Yamaguchi et al.

Patent Number: 5,477,331
Date of Patent: Dec. 19, 1995

[54] IMAGE RECORDING APPARATUS WITH INDEX INFORMATION RECORDING FEATURE

[75] Inventors: Yukuo Yamaguchi; Toshiya Matsumoto, both of Tokyo, Japan

[73] Assignee: Canon Kabushiki Kaisha, Tokyo, Japan

[21] Appl. No.: 392,690

[22] Filed: Feb. 23, 1995

Related U.S. Application Data

[63] Continuation of Ser. No. 90,639, Aug. 13, 1993, abandoned, which is a continuation of Ser. No. 757,041, Sep. 9, 1991, abandoned.

[30] Foreign Application Priority Data

Sep. 14, 1990 [JP] Japan .................. 2-244869
Sep. 17, 1990 [JP] Japan .................. 2-243819
Nov. 13, 1990 [JP] Japan .................. 2-303842

[51] Int. Cl.⁶ .................. H04N 1/21; H04N 1/23; G03B 27/44
[52] U.S. Cl. .................. 358/296; 358/302; 355/54
[58] Field of Search .................. 358/296, 302, 358/335, 527, 537, 540; 354/120; 355/54

[56] References Cited

U.S. PATENT DOCUMENTS

| | | | |
|---|---|---|---|
| 4,104,071 | 8/1978 | Crissy | 355/54 X |
| 4,174,174 | 11/1979 | Hunter, Jr. et al. | 355/54 X |
| 4,490,747 | 12/1984 | Yokoyama | 358/296 |
| 4,933,773 | 6/1990 | Shiota et al. | 358/302 |
| 4,953,035 | 8/1990 | Yoshio | 358/335 |
| 4,962,432 | 10/1990 | Ohtsuka et al. | 358/302 |
| 5,047,868 | 9/1991 | Takeda et al. | 358/335 |
| 5,146,604 | 9/1992 | Takada | 395/425 |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image recording apparatus includes a first recording device for recording an original image on a recording medium, storage device for storing a plurality of pieces of index information a selection device to select a piece of index information, a counting device to determine the number of times the piece of index information has been selected and a second recording device for recording the index information selected from the plurality of pieces of index information, and the determined number on the recording medium.

9 Claims, 23 Drawing Sheets

| DATA NO. | CODE INFORMATION | VARIABLE |
|---|---|---|
| 001 | START | $a_1$ |
| 002 | REPORT | $a_2$ |
| 003 | MEMO | $a_3$ |
| 004 | STUDY | $a_4$ |
| ⋮ | ⋮ | ⋮ |

| PHOTOTAKING SW. | CODE INFORMATION | VARIABLE |
|---|---|---|
| PHOTOTAKING 1 | START | $a_1$ |
| PHOTOTAKING 2 | REPORT | $a_2$ |
| PHOTOTAKING 3 | STUDY | $a_4$ |

| DATA NO. | CODE INFORMATION | VARIABLE |
|---|---|---|
| 001 | START | $b_1$ |
| 002 | REPORT | $b_2$ |
| 003 | MEMO | $b_3$ |
| 004 | STUDY | $b_4$ |
| ⋮ | ⋮ | ⋮ |

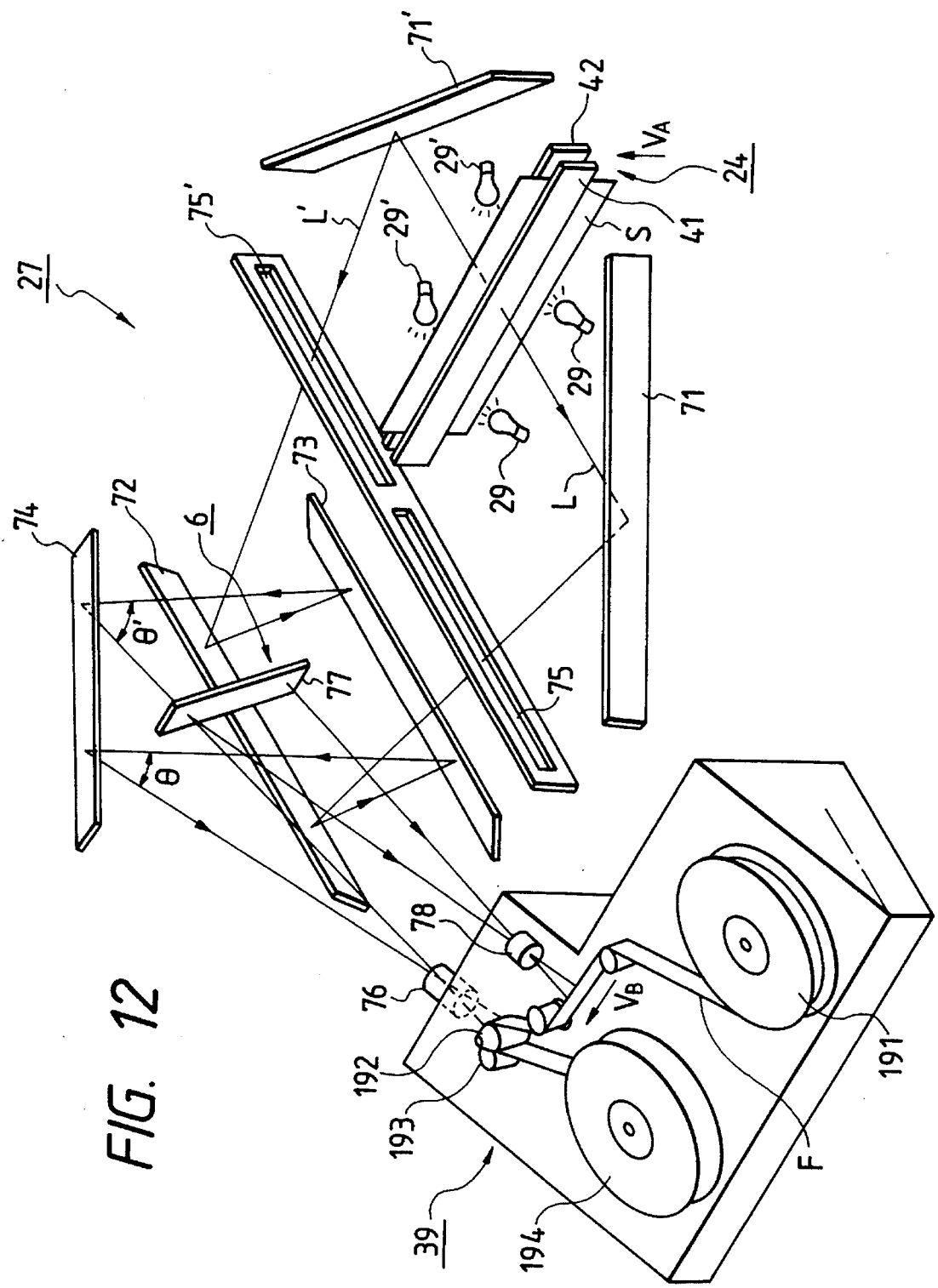

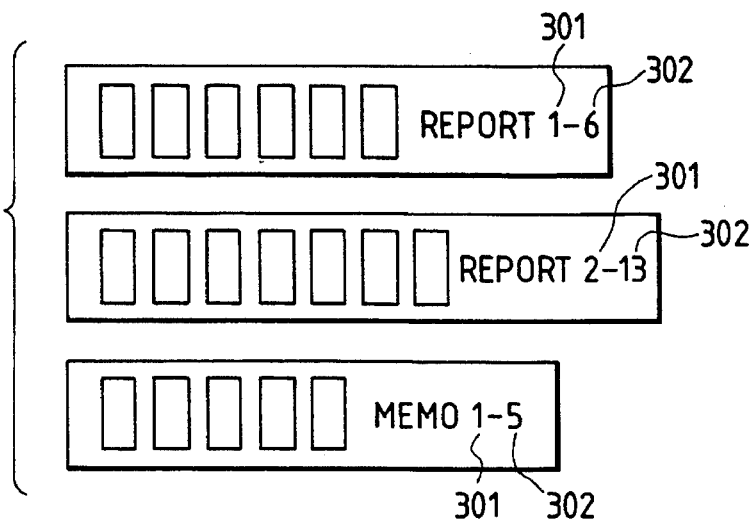
FIG. 19
FIG. 20
| DATA NO. | CODE INFORMATION |
|---|---|
| 001 | START |
| 002 | REPORT |
| 003 | MEMO |
| 004 | STUDY |
| ⋮ | ⋮ |
FIG. 21
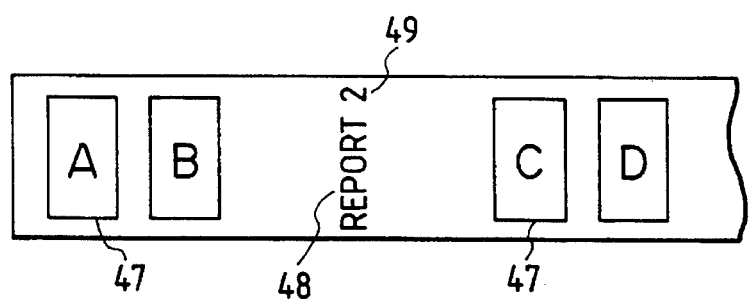

FIG. 24
| PHOTOTAKING SW. | CODE INFORMATION |
|---|---|
| PHOTOTAKING 1 | START |
| PHOTOTAKING 2 | REPORT |
| PHOTOTAKING 3 | STUDY |
FIG. 25
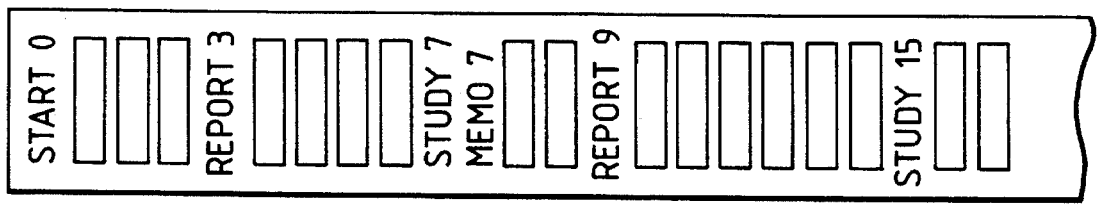
FIG. 26
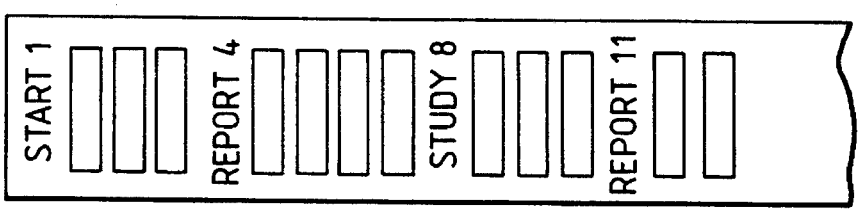

IMAGE RECORDING APPARATUS WITH INDEX INFORMATION RECORDING FEATURE

This application is a continuation of application Ser. No. 08/090,638 filed Aug. 13, 1993, now abandoned, and which is a continuation of application Ser. No. 07/757,041 filed Sep. 9, 1991, abandoned.

BACKGROUND OF THE INVENTION

1. Field of the Invention

The present invention relates to an image recording apparatus for sequentially recording an original image onto an elongated microfilm as a recording medium.

2. Related Background Art

Conventionally, as a typical image recording apparatus of this type, a rotary camera is known. The rotary camera will be exemplified below.

The rotary camera is an automatic phototaking apparatus which sequentially receives documents (or references) to be preserved as microfilms, e.g., bills, checks, stocks, documents, books, and the like, sequentially performs phototaking operations of image data of the documents on an elongated film, and exhausts the photographed documents outside the apparatus.

In some phototaking apparatuses of this type, code information (index information) represented by numerals or characters can be photograph on a film in addition to the image data to facilitate retrieval of the image data after the film is developed.

The code information may be a date or numerals in units of a given image group size, characters or symbols representing the content of an image, or the like.

Code information representing the content of an image group of a given size is recorded before or after the image group, and thereafter, a large number of recorded image groups are cut into pieces, and are classified to manage or edit the image groups. However, in the prior art, if the same code information appears repetitively, the contents of the image groups or the recording order of the image groups cannot be identified.

If code information such as numerals is photographed on each frame of a recorded image, the above-mentioned problem can be solved. However, the apparatus becomes expensive. When code information is photograph on an interframe portion of adjacent images, an image recording capacity per film is decreased, and this may disturb a process for high-speed photographing.

If code information is photographed on a non-inter-frame portion (upper or lower side of each frame) of an image, a photographable object size is undesirably decreased in order to assure a recording space for code information.

SUMMARY OF THE INVENTION

The present invention has been made to solve the above-mentioned problems, and has as its object to provide an image forming apparatus for forming image groups which can be identified even when the same code information is added to different image groups.

It is another object of the present invention to provide an image recording apparatus which can identify image groups having the same code information, can assure a large image recording capacity, and can perform high-speed phototaking processing.

In-order to achieve the above objects, according to the present invention, an image recording apparatus, which comprises image phototaking means for recording image data on a recording medium by a photographed operation, and code photographed means for phototaking code information selected from a large number of pieces of code information on the recording medium, is characterized by comprising processing means for, when the code photographs means phototakes the selected code information on the recording medium, performing control to photograph a total phototaking count (additional information) of the same selected code information in addition to the code information.

When the code phototaking means photographs the selected code information on the recording medium, a recording count (additional information) of image data sandwiched between the code information and a start image (including the start image) may be photographed in addition to the code information.

In this case, when pieces of code information are continuously photographed, it is preferable that no recording count is added to the second and subsequent pieces of code information.

When code information which is the same as the previously phototaken code information is selected and photographed, a total recording count of image data may be recorded as additional information in addition to the total phototaking count of the code information.

According to the present invention with the above arrangement, when code information representing a content of an image group is selected and photographed upon recording of a given number of images, a selection count (additional information) of the code information is recorded in addition to the code information. Therefore, when image groups having the same code information are arranged after the recording medium is cut into image groups in correspondence with code information, the recording content and recording order of the image groups can be identified on the basis of the total phototaking count.

The present invention comprises image phototaking means for recording image data on a recording medium by a photographing operation, and code phototaking means for photographing code information selected from a large number of pieces of code information on the recording medium, and is characterized by comprising processing means for, when the code information is photographed, performing control to photograph a total phototaking count (additional information) of image data in addition to the code information.

According to the present invention with this arrangement, when code information representing a content of an image group is selected and photographed upon recording of a given number of images, a total phototaking count of image data at that time is photographed before or after the image group in addition to the code information. Therefore, even after the large number of image groups are cut in units of image groups, the content and recording order of each image group can be identified on the basis of the code information and the total phototaking count of image data.

BRIEF DESCRIPTION OF THE DRAWINGS

FIG. 12 is a schematic perspective view showing an arrangement of an optical system of the image recording apparatus;

FIGS. 18 and 19 show the outer appearance of a film cut into image groups photographed with code information and additional information in the third embodiment;

FIG. 20 shows another embodiment of a data table according to the present invention; FIG. 21 shows the outer appearance of a film for exemplifying photographed code information of the fourth embodiment;

FIG. 24 shows a registration state by a registration means;

FIGS. 25 and 26 show the outer appearance of a film of the fourth embodiment photographed with code information and a total phototaking count of image data;

DETAILED DESCRIPTION OF THE PREFERRED EMBODIMENTS

Figure 1:
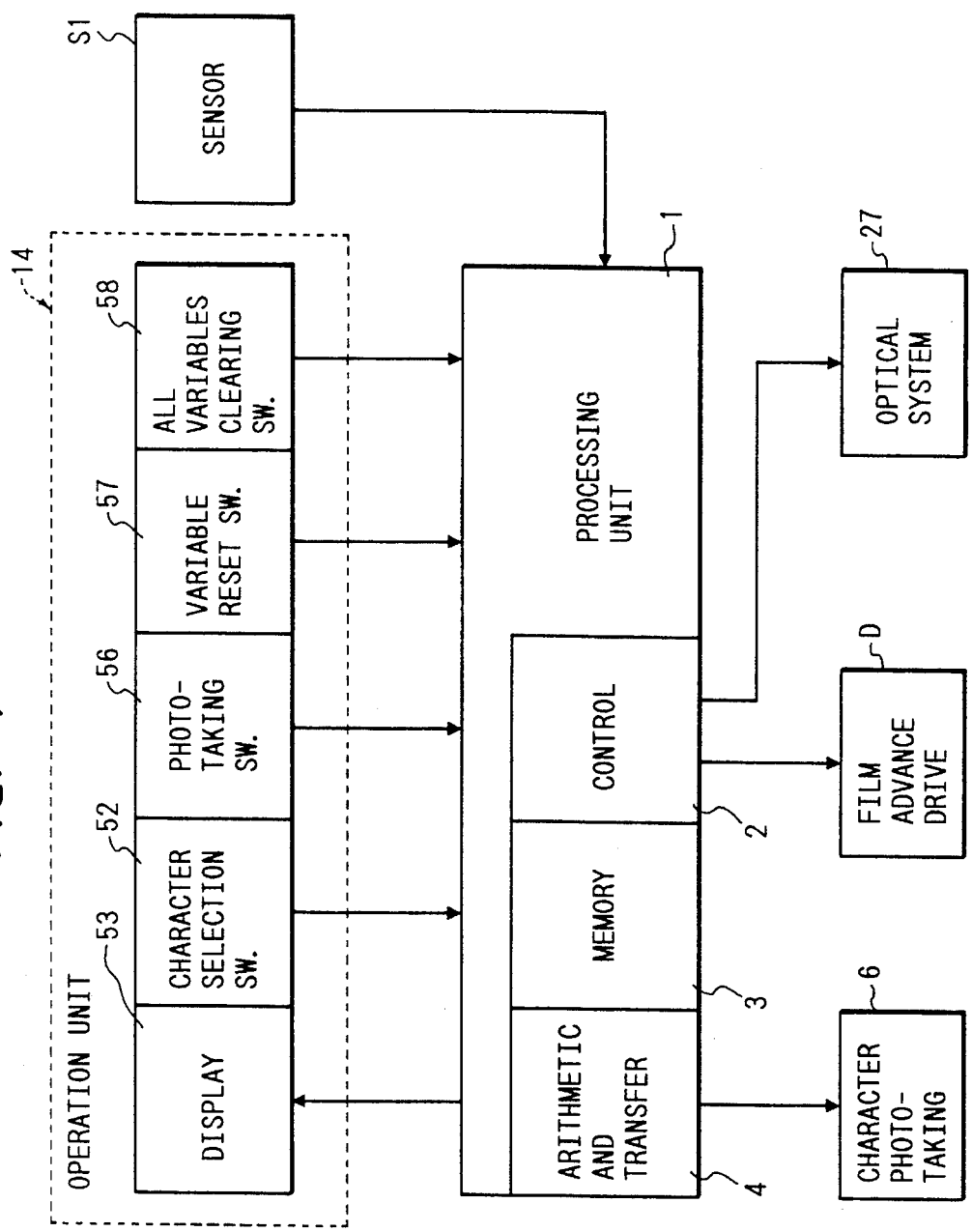
FIG. 1 is a block diagram of a control system in an image recording apparatus according to the first embodiment of the present invention.

A rotary camera as a phototaking apparatus according to the first embodiment of the present invention will be described hereinafter with reference to the drawings. FIG. 1 is a block diagram of a control system, FIG. 2 is a perspective view showing the outer appearance of the apparatus, and FIGS. 3 and 12 are schematic views of the interior of the apparatus.

Figure 2:
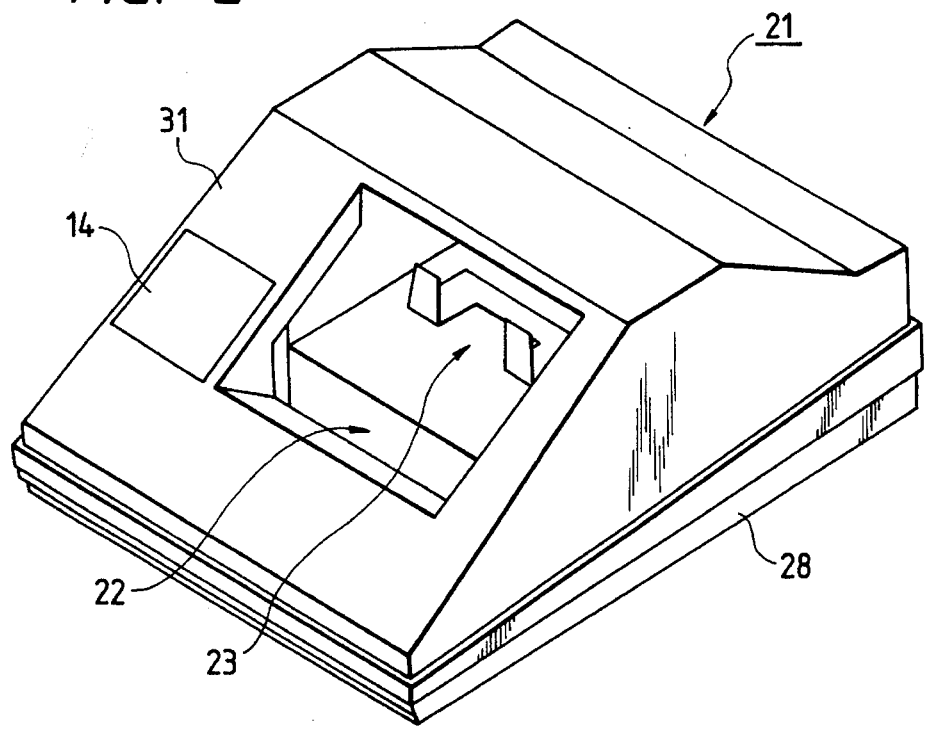
FIG. 2 is a perspective view showing the outer appearance of the image recording apparatus shown in FIG. 1.
Figure 3:
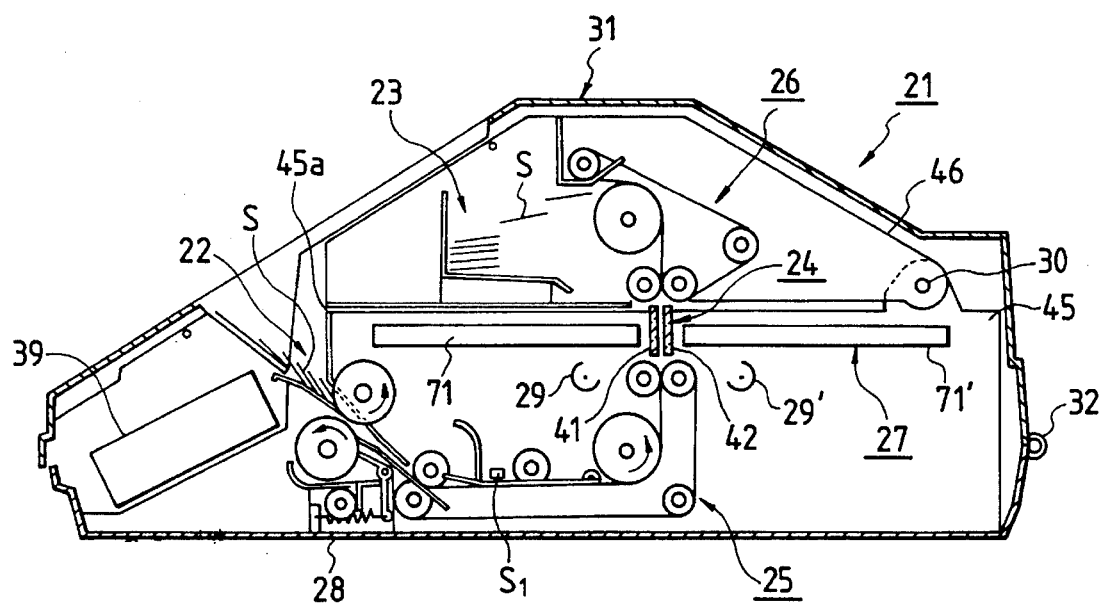
FIG. 3 is a schematic sectional view of the image recording apparatus.

In FIGS. 2 and 3, an image recording apparatus 21 comprises a supply unit 22 for supplying an object S into the apparatus, an exhaust unit 23 for exhausting the photographed object S outside the apparatus, a phototaking unit 24 as an image phototaking means arranged in the apparatus, an upstream convey unit 25 for connecting the supply unit 22 and the phototaking unit 24, and a downstream convey unit 26 for connecting the phototaking unit 24 and the exhaust unit 23. A sensor $S_1$ detects passage of the leading edge of the object S. When the sensor $S_1$ detects the object S, the phototaking unit 24 performs focusing/exposure control of the object S on a microfilm F (shown in FIG. 12) as a recording medium via an optical system 27.

In the arrangement of the respective units of the apparatus 21, the upstream convey unit 25 and the phototaking unit 24 are arranged inside a first frame 45 assembled on a base 28, and the supply unit 22 for the object S is arranged on a front end portion 45a of the first frame 45. When viewed from the front side of the apparatus, the optical system 27 is mainly arranged on the left side of the first frame 45, and a drive system (not shown) is arranged on the right side of the frame 45. Furthermore, a film chamber 39 for storing the microfilm F is arranged in front of the supply unit 22 arranged on the front side of the first frame 45. On the other hand, a second frame 46 is mounted on the first frame 45 via a rear-end hinge portion 30 so as to be openable at the front side. The downstream convey unit 26 and the exhaust unit 23 are arranged on the second frame 46. Furthermore, an outer cover 31 covers the overall apparatus, and its lower edge is in contact with the peripheral edge of the base 28. The cover 31 is fixed to the rear end of the base 28 via a hinge portion 32 at the rear end, so as to be openable at the front side.

FIG. 12 shows an arrangement of the optical system 27. More specifically, optical paths L and L' of optical images on the front and back surfaces of the object S passing through the phototaking unit 24 located at substantially the center of the interior of the apparatus are bent via a plurality of mirrors as a reflection means, i.e., first to fourth mirrors 71, 72, 73, and 74 in this embodiment, and are focused and exposed from the central portion of the apparatus on the microfilm F arranged in the front portion of the apparatus via the left side of the first frame 45. More specifically, first mirrors 71 and 71' respectively opposing front and back original surfaces of the object S are respectively arranged at the front and rear sides of a pair of parallel guide glasses 41 and 42 constituting the phototaking unit 24. The first mirrors 71 and 71' are arranged at an inclination angle of about 45° in a direction to open from the left side of the apparatus with respect to the parallel guide glasses 41 and 42, thereby bending the optical paths L and L' of the front and back optical images of the object S from the frontto-back direction of the apparatus toward the left side at a substantially right angle.

On the other hand, the second mirror 72 is arranged to extend along the left side of the first frame 45, and to oppose the first mirrors 71 and 71'. The second mirror 72 is arranged at substantially the same level as the first mirrors 71 and 71'. The reflection surface of the mirror 72 is inclined downward to oppose the third mirror arranged below the second mirror 72. Slits 75 and 75' for regulating the optical paths L and L' are arranged between the first mirrors 71 and 71', and the second mirror 72.

On the other hand, the fourth mirror 74 is arranged above the second mirror 72, so that its reflection surface opposes the third mirror 73. The fourth mirror 74 is inclined with respect to the third mirror 73 in a direction to increase an interval at the front edge side. The fourth mirror 74 is arranged at the highest level of the first to fourth mirrors 71, 72, 73, and 74, and is located behind the phototaking unit 24 in the front-to-back direction of the apparatus.

With these mirrors, the optical paths L and L' of the front and back optical images of the object S are bent at a right angle from the front-to-back direction of the apparatus to the left side of the apparatus, and are then bent downward by the second mirror 72. The optical paths are bent upward by the third mirror 73, and are then bent by the fourth mirror 74 to the front side of the apparatus. In this manner, the optical paths are focused and exposed on the microfilm F as a recording medium via a phototaking lens 76 arranged on the front surface side of the apparatus. As a result, the front and back images of the object S are recorded side by side on the microfilm F.

Angles θ and θ' respectively formed between the optical axes of incident light components propagating from the third mirror 73 to the fourth mirror 74, and the optical axes of reflected light components propagating from the fourth mirror 74 to the microfilm F are set to be acute angles. With this arrangement, the optical paths of light components reflected by the fourth mirror 74 are gradually inclined downward toward the front side.

The microfilm F is fed from a supply reel 191 around which an unexposed, unused film is wound, and is taken up by a take-up reel 194 via a portion between a capstan roller 192 opposing the phototaking lens 76, and a pinch roller 193. An image of the object S is slit-exposed at a portion of the capstan roller 192. A feed speed $V_B$ of the microfilm F is synchronized with a feed speed $V_A$ of the object S which passes between the parallel guide glasses 41 and 42 of the phototaking unit 24 in correspondence with a magnification.

The rear portion of the film chamber 39 is inclined upward, so that the exposure surface of the microfilm F opposes the optical paths from the fourth mirror 74 at a right angle.

A character phototaking unit 6 serving as a code information phototaking means includes a code information display plate 77 for displaying code information. The code information display plate 77 is mounted on the side plate of the second frame 46 (FIG. 3), and is used for recording code information such as characters, numerals, a date, symbols, and the like on the microfilm F using a code information phototaking lens 78 separate from the phototaking lens 76. Feed control of the microfilm F is performed so as to prevent the code information from overlapping image data.

In the image recording apparatus with the above-mentioned arrangement, the front and back surfaces of the object S conveyed from the supply unit 22 to the phototaking unit 24 via the upstream convey unit 25 are illuminated with illumination lamps 29 and 29' arranged before and after the phototaking unit 24. The front and back optical images of the object S are sequentially reflected by the first to fourth mirrors 71 (71'), 72, 73, and 74, and are focused and exposed on the microfilm F arranged in the front end portion of the apparatus by the phototaking lens 76. Both the object S and the microfilm F are moved in synchronism with a reduction ratio, and photographing operations are successively performed via the slits 75 and 75'.

The phototaking apparatus with the above arrangement is controlled by a control system shown in the block diagram of FIG. 1. In FIG. 1, a processing unit 1 comprising, e.g., a microprocessor performs a processing operation in accordance with input instructions from the sensor $S_1$ and an operation unit 14. The processing unit 1 comprises a control unit 2 for controlling a film advance drive unit D and the optical system 27. A memory 3 of the processing unit 1 comprises a storage means for prestoring a large number of pieces of code information, a registration means for registering the code information in correspondence with specific switches, and the like. An arithmetic & transfer unit 4 of the processing unit 1 searches code information to be photographed from the memory 3, and transfers it to the character phototaking unit 6 as the code information phototaking means.

Figures 4, 5:
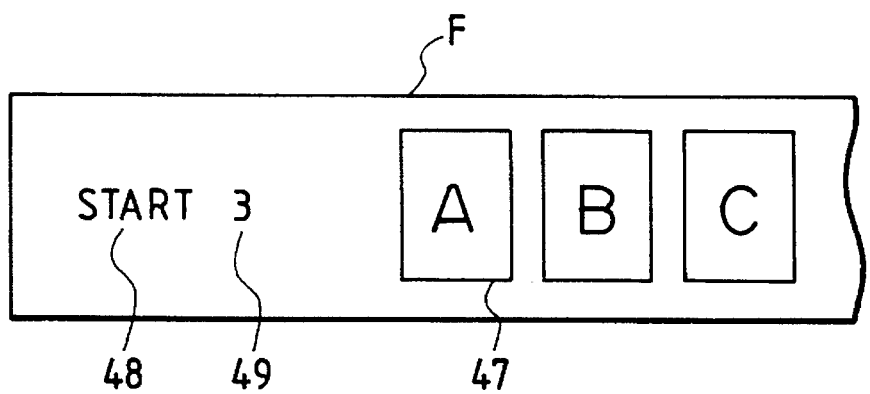
FIG. 4 shows a data table.
FIG. 5 shows the outer appearance of a film for exemplifying phototaken code information.

FIG. 4 shows a data table showing a correspondence among code information as index data in the storage means of the memory 3, data numbers for selecting the code information, and variables as additional information indicating a total phototaking count of the code information. As can be seen from FIG. 4, when a data number, e.g., "001" is selected, character data as code information "START" is selected, and is photographed by the character phototaking unit 6. FIG. 5 shows the photographed microfilm F. Note that the microfilm F shown in FIG. 5 includes image data 47 of the photographing object S, phototaken code information 48, and a phototaking count (additional information) 49 of the selected code information.

Figure 6:
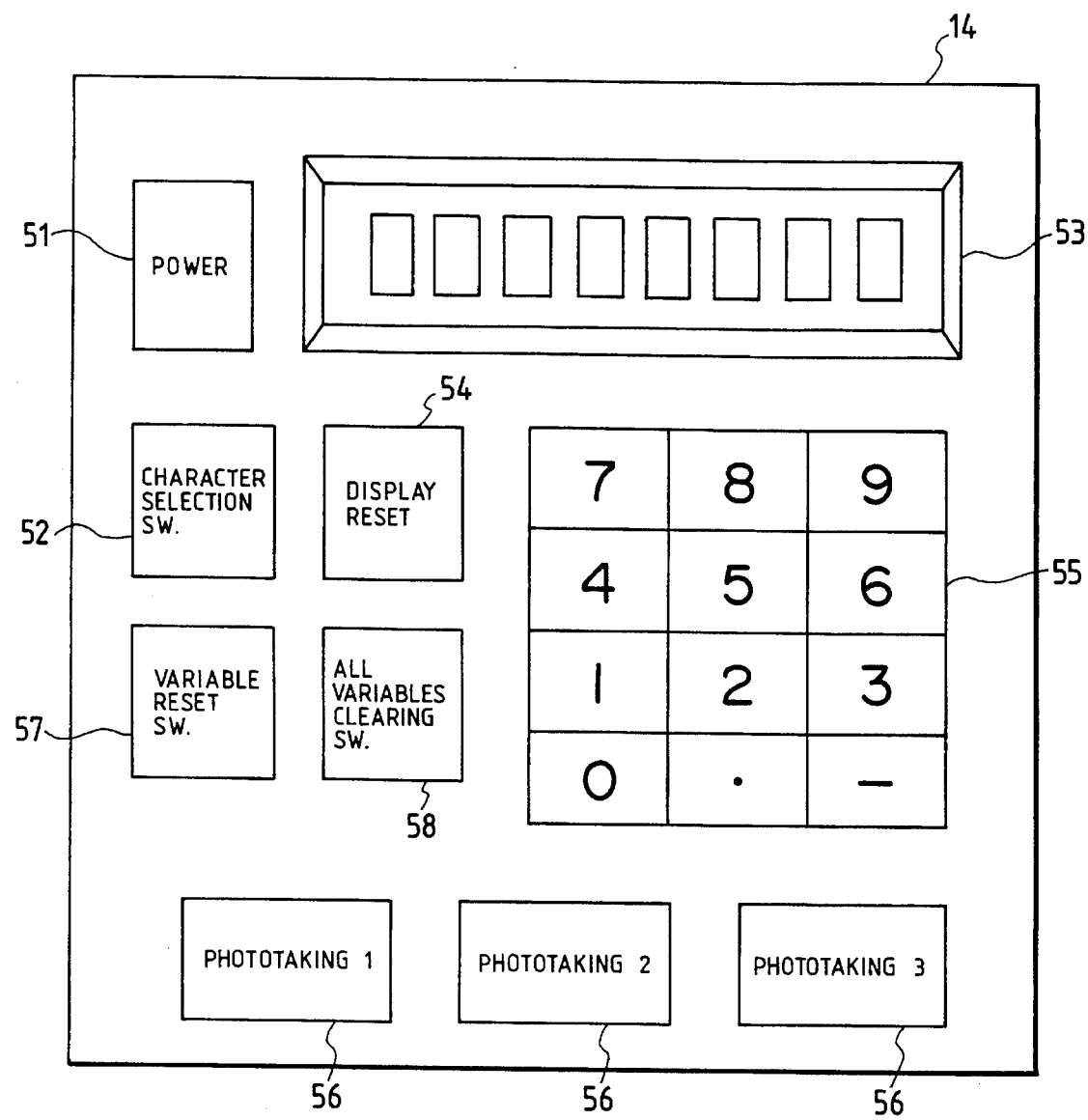
FIG. 6 shows a key arrangement of an operation unit.

FIG. 6 shows a key arrangement of the operation unit 14 of the phototaking apparatus of the present invention. As shown in FIG. 6, the operation unit 14 is provided with a power switch (POWER) 51, a character selection switch 52, a display unit 53 for displaying a phototaking processing count, a total phototaking processing count, a non-recording feed length, a data number representing code information, and the like, a display reset button 54, a ten-key pad 55 as a selection means for selecting arbitrary code information from pieces of code information stored in the storage means of the memory 3 using the data number, phototaking switches 56 which are registered in the registration means of the memory 3 together with the corresponding code information, a variable reset switch 57 as a reset button of a total phototaking count of selected code information, an all variables clearing switch 58 as a result button of total phototaking counts of all the pieces of code information, and the like. In this embodiment, the three phototaking switches 56 are arranged to register, e.g., 3 code information, and are referred to as a "phototaking 1" switch, a "phototaking 2" switch, and a "phototaking 3" switch, respectively. However, the number of phototaking switches 56 is not limited to three.

Figure 7:
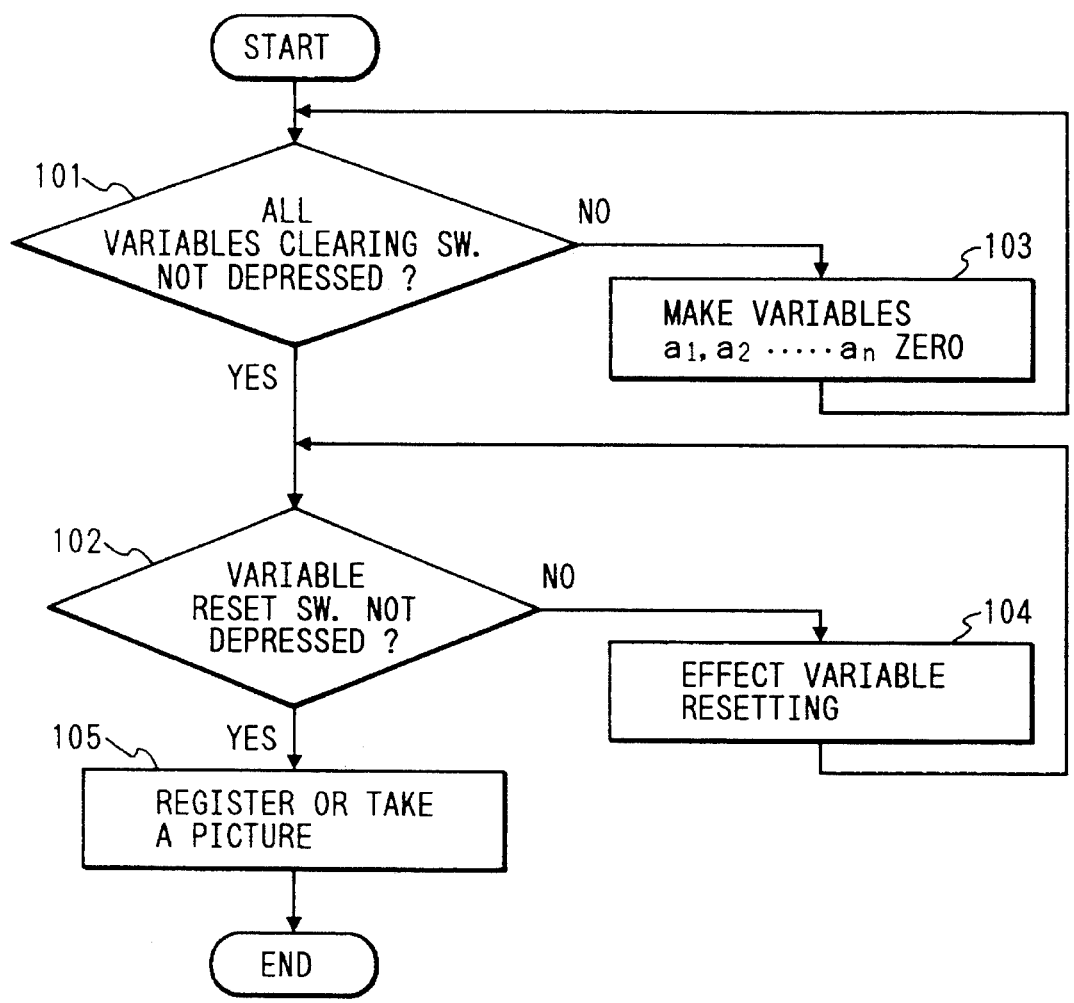
FIGS. 7, 8, and 9 are flow charts showing processing operations of the image recording apparatus according to the present invention.

The processing sequence of the present invention will be described below with reference to the flow charts shown in FIGS. 7 to 9. FIG. 7 shows the main flow chart, FIG. 8 shows the flow chart of processing for resetting a total phototaking count of selected code information (to be referred to as variable resetting processing hereinafter), and FIG. 9 shows the flow chart of processing for registering selected code information in correspondence with specific switches (to be referred to as registration processing hereinafter).

In FIG. 7, it is checked if the all variables clearing switch 58 is not depressed (step 101). If it is determined that the switch 58 is depressed, all the variables $a_1, a_2, \ldots, a_n$ an are reset to an initial value 0 (step 103). On the other hand, if it is determined that the variable reset switch 57 is depressed without detecting depression of the all variables clearing switch 58 (step 102), variable resetting processing is executed (step 104). If it is determined that the variable reset switch 57 is not depressed, a standby state of registration processing or phototaking processing is set.

Figure 8:
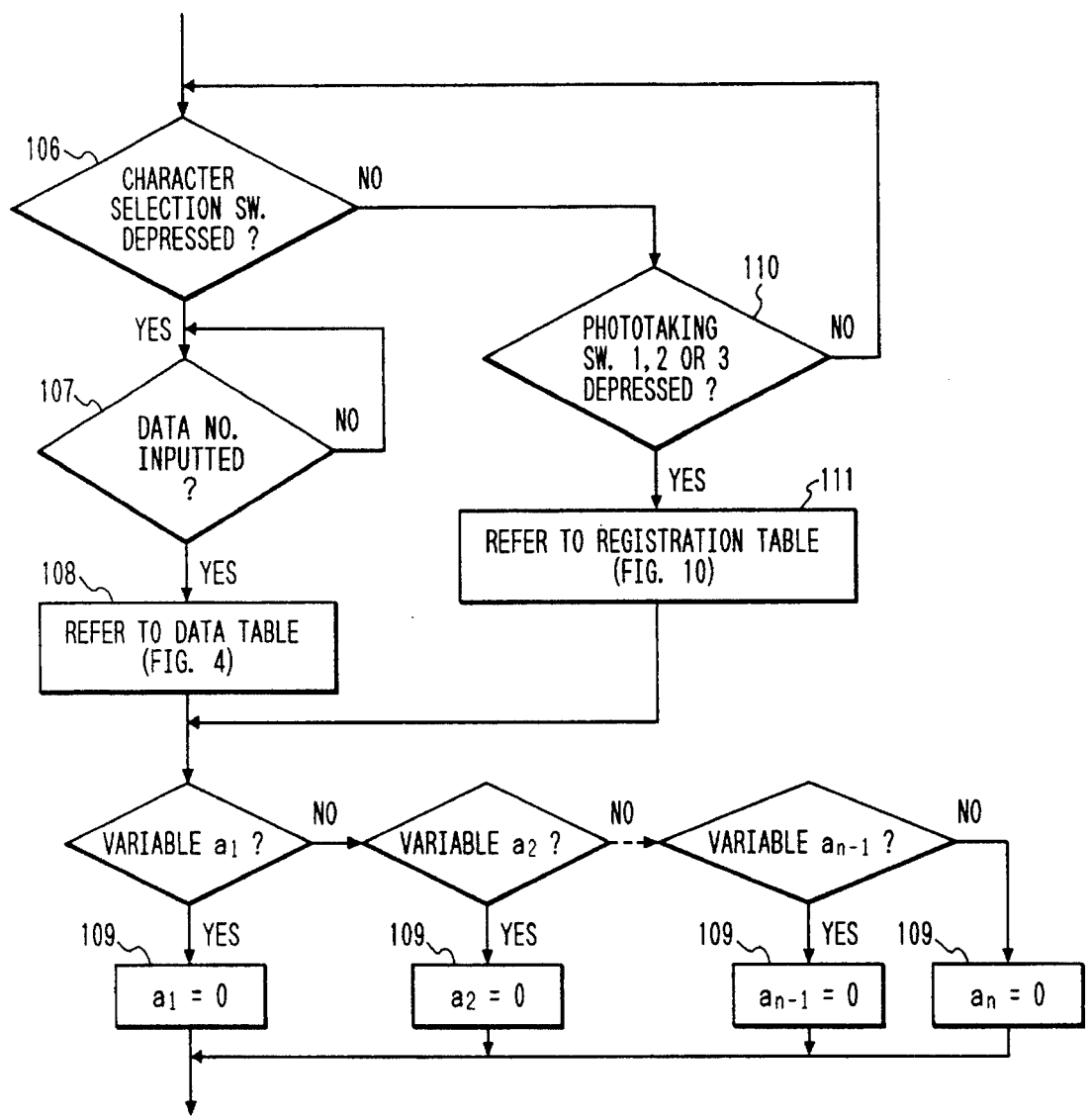
Figure 9:
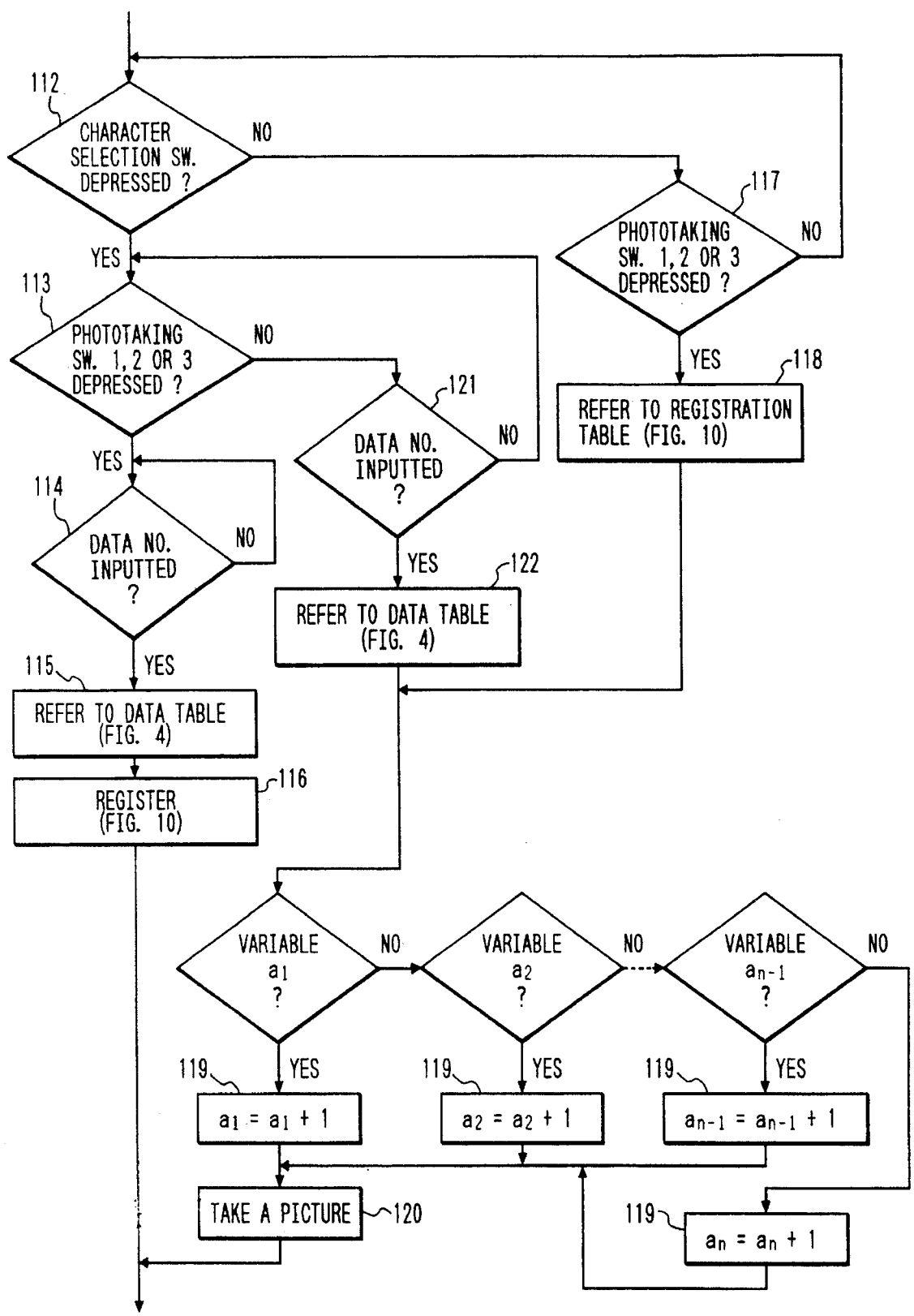

In the variable resetting processing, as shown in FIG. 8, it is checked if the character selection switch 52 is depressed (step 106). If it is determined that the switch 52 is depressed, the control waits for a data number of code information inputted using the ten-key pad 55 (step 107). If the data number is inputted, the input data number is displayed on the display unit 53 shown in FIG. 6. Thus, a user refers to a separately prepared data table (e.g., one shown in FIG. 4) as a correspondence table between data numbers and code information (step 108), and can check the content of the code information. When the data number is inputted, the processing unit 1 reads out a variable (e.g., a variable $a_1$ for the data number 001) corresponding to the input data number from the data table shown in FIG. 4, and replaces the readout variable with 0 (step 109). On the other hand, if it is determined that one of the phototaking 1, 2, and 3 switches 56 is depressed (step 110) without detecting depression of the character selection switch 52 in step 106, a variable (see FIG. 10) registered by the registration means of the memory 3 in correspondence with the ON switch 56 is read out by the arithmetic & transfer unit 4 (step 111), and the readout variable is replaced with 0 in step 109.

The registration processing and the phototaking processing will be described below with reference to FIG. 9. In the registration processing, it is checked if the character selection switch 52 is depressed (step 112). If it is determined that the switch 52 is depressed, it is checked if one of the phototaking 1, 2, and 3 switches 56 is depressed (step 113).

If it is determined that one of the phototaking switches 56 is depressed, the control waits for a data number of code information inputted using the ten-key pad 55 (step 114). In this case, if the data number is inputted, the input data number is displayed on the display unit 53 shown in FIG. 6.

When the data number is inputted, the processing unit 1 reads out code information corresponding to the data number from the data table shown in FIG. 4 via the arithmetic & transfer unit 4 (step 115), and registers the readout code information and its variable in the registration means in the memory 3 in correspondence with the phototaking switch 56 depressed in step 102 (step 116), thus ending the registration processing.

Figures 10, 11, 13:
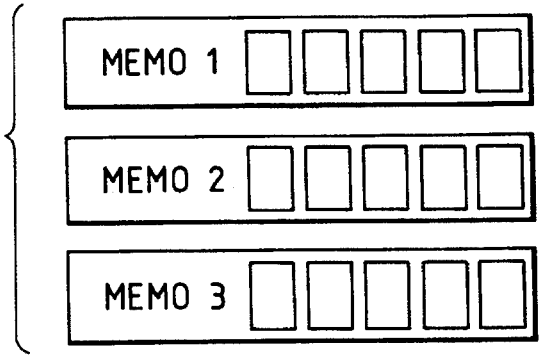
FIG. 10 shows a registration state by a registration means.
FIG. 11 shows the outer appearance of a film cut into image groups photographed with code information and additional information in the first embodiment.
FIG. 13 shows a data table according to the second embodiment of the present invention.

With this registration processing, registrations shown in the registration table of FIG. 10 are made in the registration means in correspondence with the phototaking 1, 2, and 3 switches 56.

The phototaking processing will be described below. A case will be described below wherein the registered code is to be photographed. If it is determined that one of the phototaking 1, 2, and 3 switches 56 is depressed (step 117) without detecting depression of the character selection switch 52 in step 112, the arithmetic & transfer unit 4 reads out the code information and its variable (see FIG. 10) registered in the registration means of the memory 3 in correspondence with the ON switch 56 (step 118), and 1 is added to the readout variable (step 119). The code information and the variable are photographed on the microfilm F by the character phototaking unit 6 via the arithmetic & transfer unit 4 (step 120).

A case will be described below wherein a selected code is to be directly photographed. If it is determined in step 112 that the character selection switch is depressed, and if a data number is inputted using the ten-key pad 55 (step 121) without detecting depression of the phototaking switches 56 in step 113, the processing unit 1 reads out code information and a variable corresponding to the input data number from the data table shown in FIG. 4 (step 122), and 1 is added to the readout variable in step 119. Thereafter, phototaking processing is executed in step 120.

In this manner, since arbitrary code information selected from a large number of pieces of code information can be photographed, code information according to the content of an image to be phototaken or a phototaking condition can be photographed, and it is effective when images are checked or retrieved after the microfilm is developed.

The number of phototaking processing operations is counted in correspondence with each code information, and the total count is photographed in addition to the code information. When the developed microfilm is cut and classified into some image groups in correspondence with the code information, the recording contents or phototaking orders of the image groups having the same code information can be identified based on the total phototaking counts of the code information, as shown in FIG. 11. Therefore, the present invention can be very effectively applied to, e.g., a processor camera which feeds and cuts a film by the number of photographed image frames, and develops the cut film frames.

In this embodiment, as an example of code information to be able to be selected, alphabet character strings are set. In addition, numerals, symbols, and the like may be used to photograph code information expressing various meanings.

Code information and its variable may be photographed in either the longitudinal or widthwise direction, or may be photographed at an end portion of a film, or any of upper, lower, right, and left positions of an image.

Whether or not a total phototaking count of code information is to be additionally photographed may be selected.

The second embodiment of the present invention will be described below. In this embodiment, code information representing a content of an image group is photographen after the image group, and a total image count of images constituting the image group is photographed in addition to the code information. When the same code information is selected and photographed a plurality of times, a total image count of all the images in the image group constituted by the code information is recorded as additional information.

The second embodiment of the present invention will be described below with reference to FIGS. 13 to 16. Note that the same reference numerals in the second embodiment denote the same parts as in the first embodiment. FIG. 13 shows a data table showing a correspondence among code information, a data number for selecting the code information, and a variable representing a total count of all the images in the image group constituted by the code information, FIG. 14 shows the main flow chart, FIG. 15 shows the flow chart of processing for resetting a total image count of images in an image group constituted by the selected code information, and FIG. 16 shows the flow chart of registration processing and phototaking processing.

Figure 14:
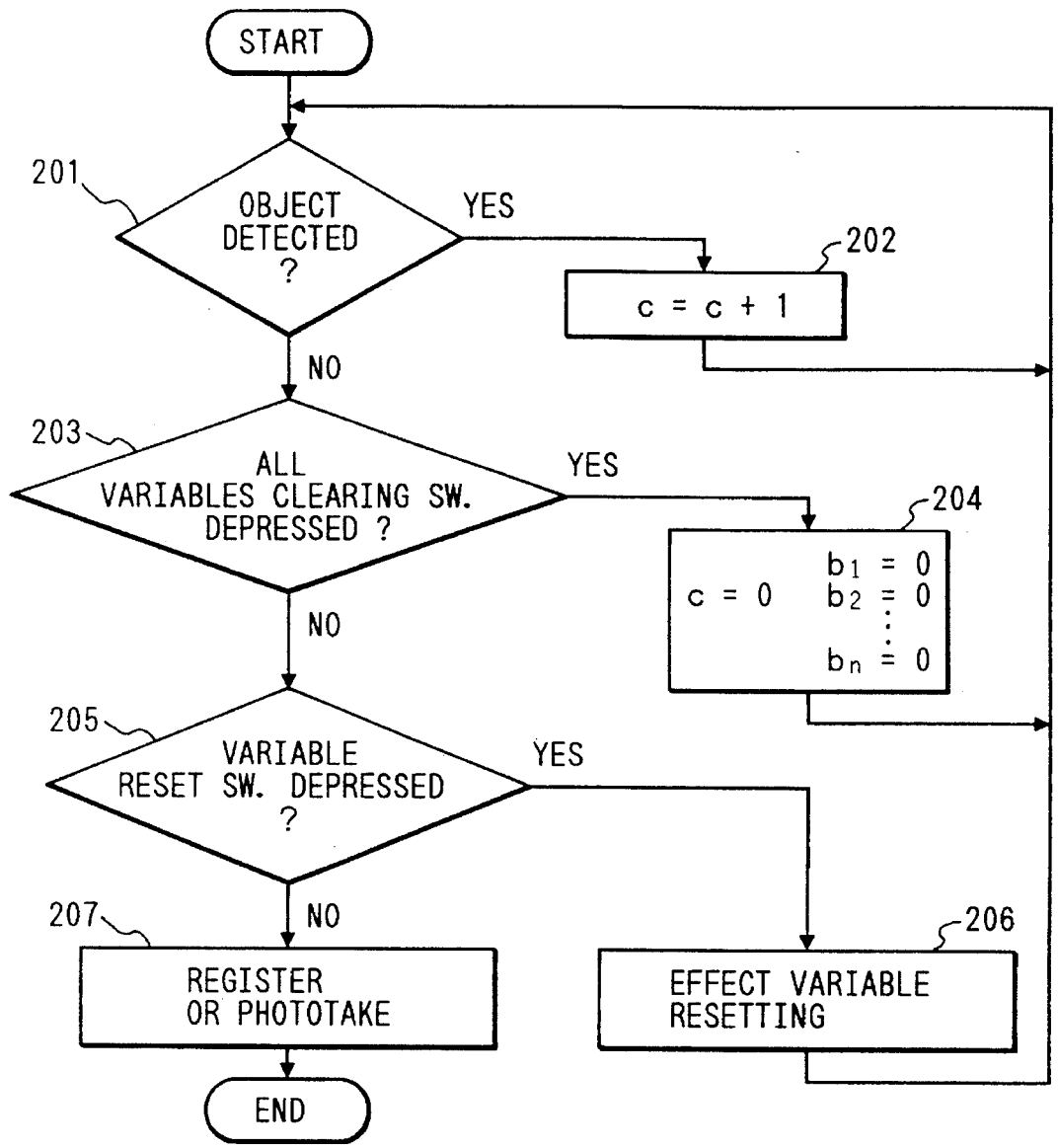
FIGS. 14, 15, and 16 are flow charts showing a processing means of the second embodiment.

In FIG. 14, a sensor for detecting an object checks passage of an object (step 201). If the sensor detects the object, 1 is added to a variable C representing a total image phototaking processing count (step 202). On the other hand, if an all variables clearing switch 58 is depressed (step 203) without detecting an object, all the variables are replaced with 0 (step 204). If a variable reset switch 57 is depressed without detecting depression of the all variables clearing switch 58, variable resetting processing is executed (step 206). If the variable reset switch is not depressed (step 205), a standby state of registration processing or phototaking processing is set (step 207).

Figure 15:
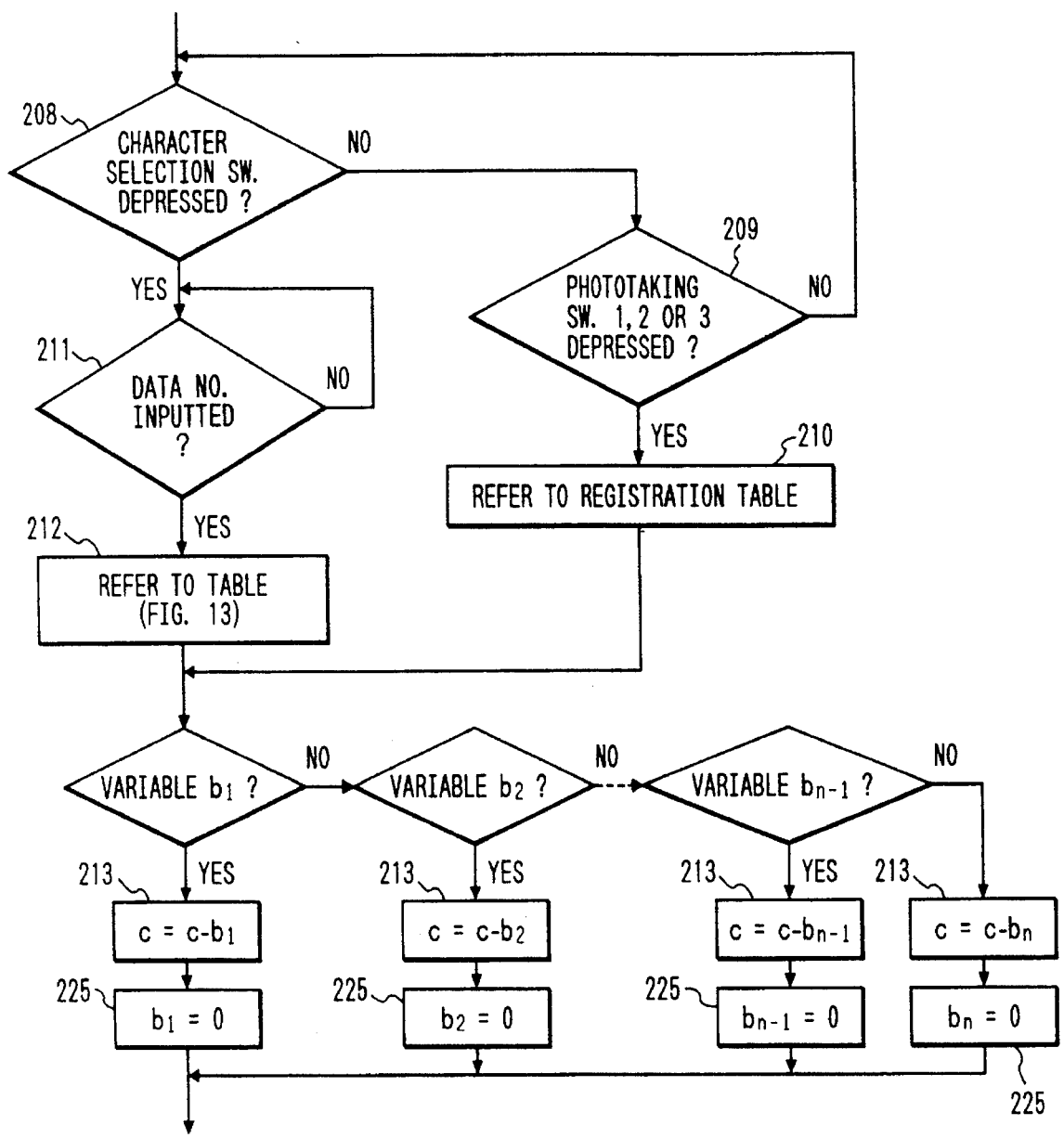
Figure 16:
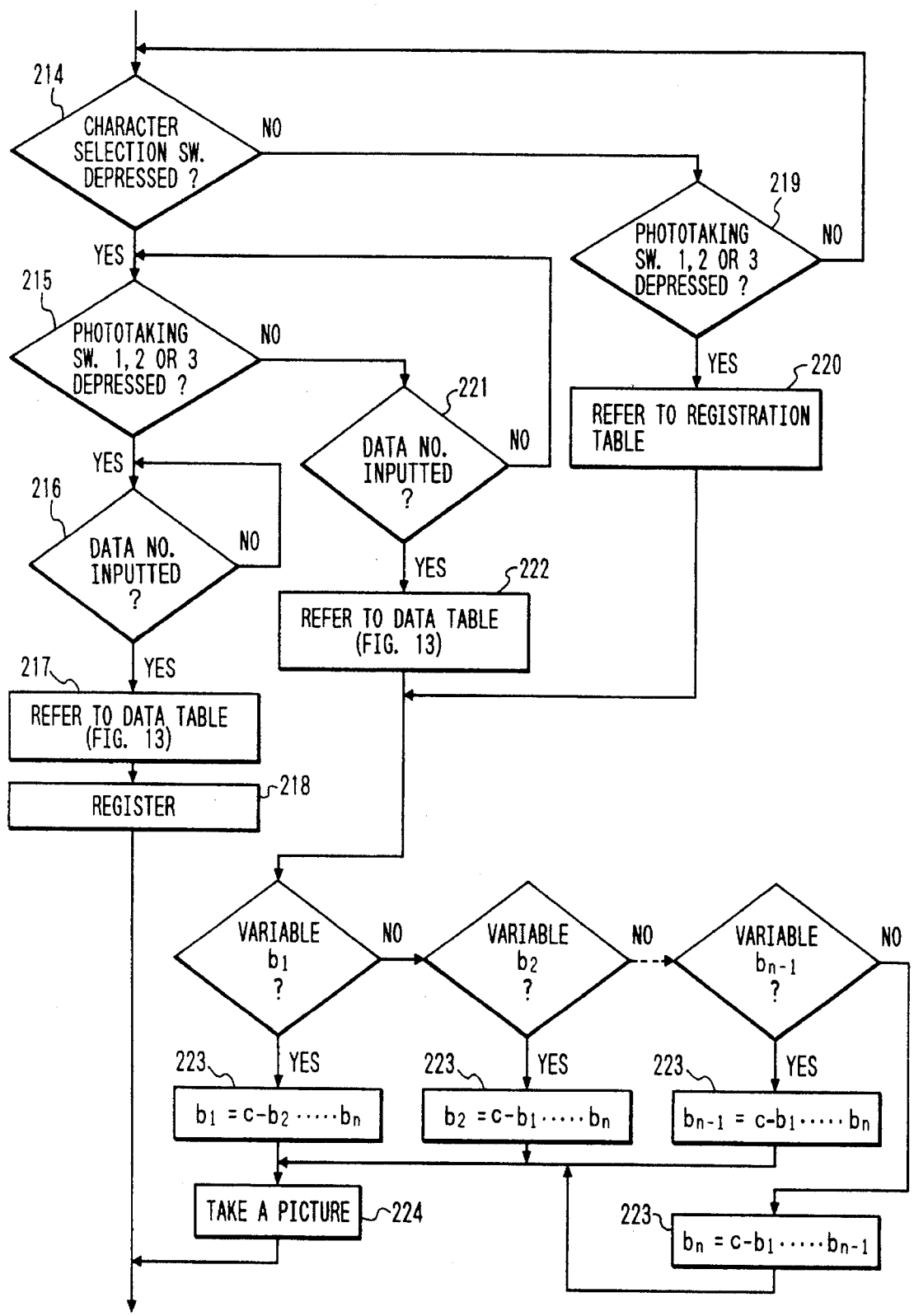

In the variable resetting processing, as shown in FIG. 15, it is checked if a character selection switch 52 is depressed (step 208). If it is determined that the switch 52 is depressed, the control waits for a data number of code information inputted using a ten-key pad 55 (step 211). If the data number is inputted, a variable corresponding to the input data number is read out from the data table shown in FIG. 13 (step 212), and the readout variable is replaced with 0 (step 225) via arithmetic processing in step 213. On the other hand, if it is determined that one of phototaking switches 56 is depressed (step 209) without detecting depression of the character selection switch 52 in step 208, a variable registered in a memory (not shown) in correspondence with the ON phototaking switch 56 is read out (step 210), and the readout variable is replaced with 0 in step 225 via arithmetic processing in step 213.

The registration processing and the phototaking processing will be described below with reference to FIG. 16. In the registration processing, it is checked if the character selection switch 52 is depressed (step 214). If it is determined that the switch 52 is depressed, it is checked if the phototaking switch 56 is depressed (step 215). If it is determined that the phototaking switch 56 is depressed, the control waits for a data number of code information inputted using the ten-key pad 55 (step 216). In this case, when the data number is inputted, code information corresponding to the inputted data number is read out from the data table shown in FIG. 13 (step 217), and the code information and its variable are registered in the memory (not shown) in correspondence with the phototaking switch 56 depressed in step 215 (step 218), thus ending the registration processing.

The phototaking processing will be described below. A case will be described below wherein a registered code is to be photographed. If it is determined that one of the phototaking switches 56 is depressed (step 219) without detecting depression of the character selection switch 52 in step 214, the code information and the variable registered in the memory (not shown) are read out (step 220), and are photographed on a microfilm F by a character phototaking unit 6 (step 224) via arithmetic processing in step 223.

A case will be described below wherein a selected code is to be directly photographed. If it is determined in step 214 that the character selection switch 52 is depressed, and if a data number is inputted using the ten-key pad 55 (step 221) without detecting depression of the phototaking switch 56 in step 215, code information and a variable corresponding to the input data number are read out from the data table shown in FIG. 13 (step 222), and are subjected to phototaking processing in step 224 via arithmetic processing in step 223.

Figure 17:
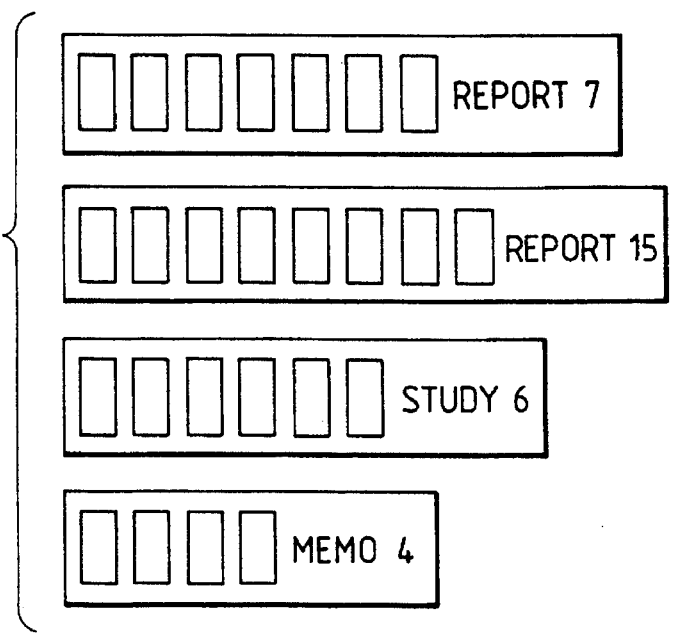
FIG. 17 shows the outer appearance of a film cut into image groups photographed with code information and additional information in the second embodiment.

FIG. 17 shows the outer appearance of a film according to the second embodiment of the present invention. As shown in FIG. 17, since a total image count of all the images in an image group constituted by the same code information is independently photographed in correspondence with each code information, the recording contents and phototaking orders of image groups can be easily identified on the basis of the code information and the additional information.

Figure 18:
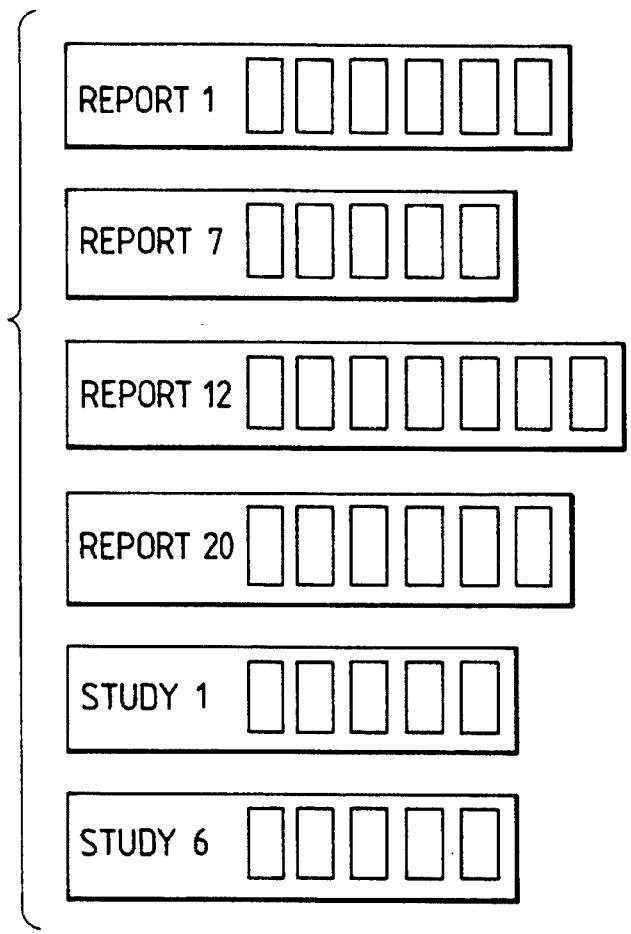

The additional information shown in FIG. 17 represents a page count of the last image (a total count of images). Alternatively, as shown in FIG. 18, 1 may be added to a variable of additional information, and may be photographed before the corresponding image group, so as to represent a page count of the start image.

When the same or different pieces of code information are continuously photographed, additional information is photographed in addition to only code information to be photographed first.

The third embodiment of the present invention will be described below with reference to FIG. 19. FIG. 19 shows the outer appearance of a film of the third embodiment. In this embodiment, a selection count of code information, and a total image count of the same code information are photographed in addition to code information. In FIG. 19, a selection count 301 of code information, and a total image count 302 of the same code information are photographed.

In this embodiment, 1 may be added to a variable representing a total image count to represent the page count of the start image like in the second embodiment.

As described above, when code information representing the content of an image group is recorded in units of a predetermined number of images, a total photographed count of the code information, or a total count of image data is additionally phototaken. Therefore, when image groups having the same code information are to be classified after the film is cut into image groups in units of code information, recording contents of the respective image groups and recording order of the image groups can be easily identified on the basis of the total phototaking count, resulting in convenience for retrieval and edit operations.

FIG. 20 shows another embodiment of a data table showing a correspondence between code information in the storage means of the memory 3, and a data number for selecting the code information. As can be seen from FIG. 20, when a data number of, e.g., "001" is selected, character data as code information "START" is selected, and is photographed by the character phototaking unit 6. FIG. 21 shows the photographed microfilm F. Note that the microfilm F shown in FIG. 21 includes image data 47 of the photographed object S, photographed code information 48, and a phototaking count (additional information) 49 of the selected code information.

Figure 22:
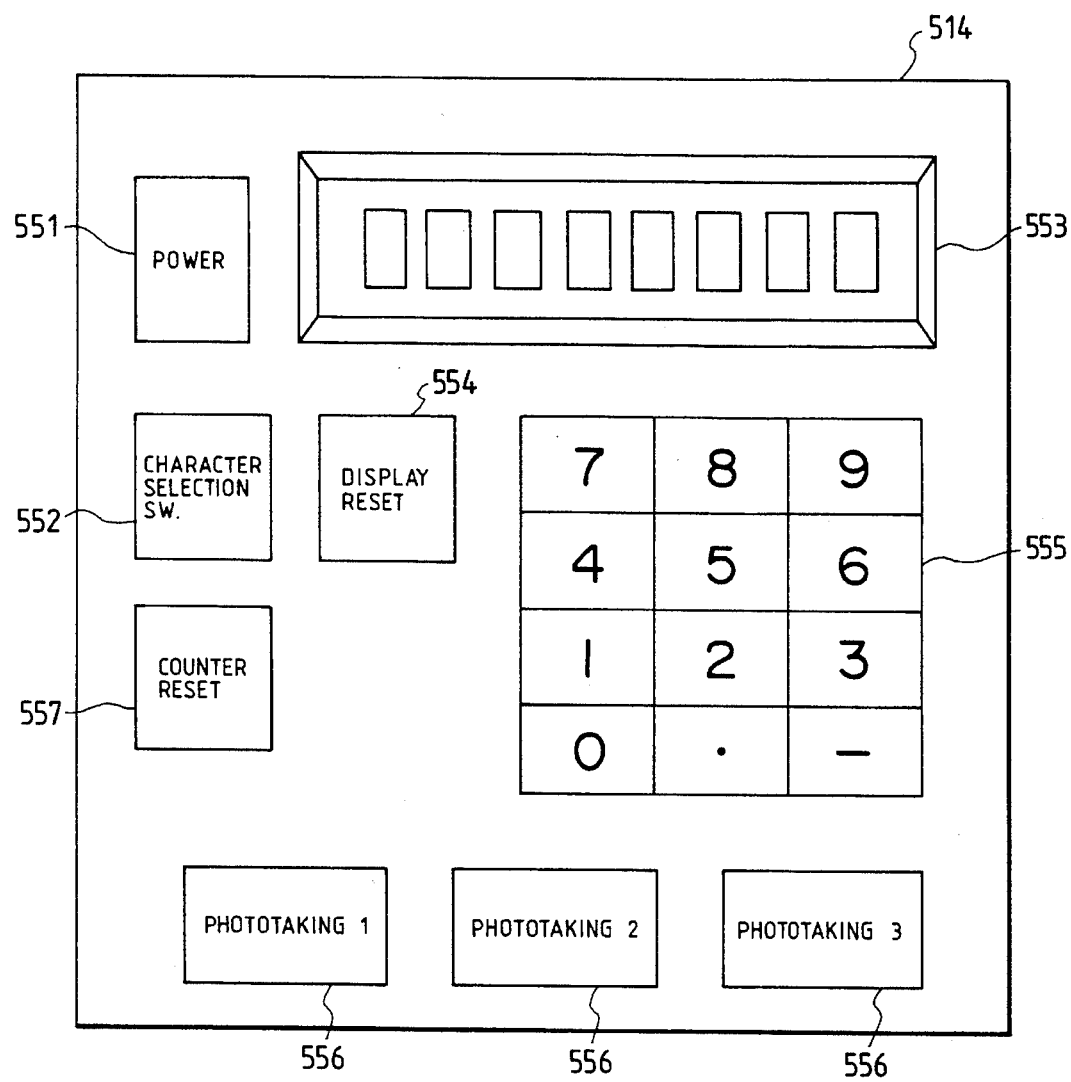
FIG. 22 shows a key arrangement of an operation unit of the fourth embodiment.

FIG. 22 shows a key arrangement of an operation unit 514 in a phototaking apparatus according to the fourth embodiment of the present invention. As shown in FIG. 22, the operation unit 514 is provided with a power switch (POWER) 551, a character selection switch 552, a display unit 553 for displaying a phototaking processing count, a total phototaking processing count, a non-recording feed length, a data number representing code information, and the like, a display reset button 554, a ten-key pad 555 as a selection means for selecting arbitrary code information from pieces of code information stored in a storage means of a memory 3 using the data number, phototaking switches 556 which are registered in a registration means of the memory 3 together with the corresponding code information, a count reset switch 557 for resetting a total phototaking processing count, and the like. In this embodiment, the three phototaking switches 556 are arranged to register, e.g., 3 code information, and are referred to as a "phototaking 1" switch, a "phototaking 2" switch, and a "phototaking 3" switch, respectively. However, the number of phototaking switches 556 is not limited to three.

Figure 23:
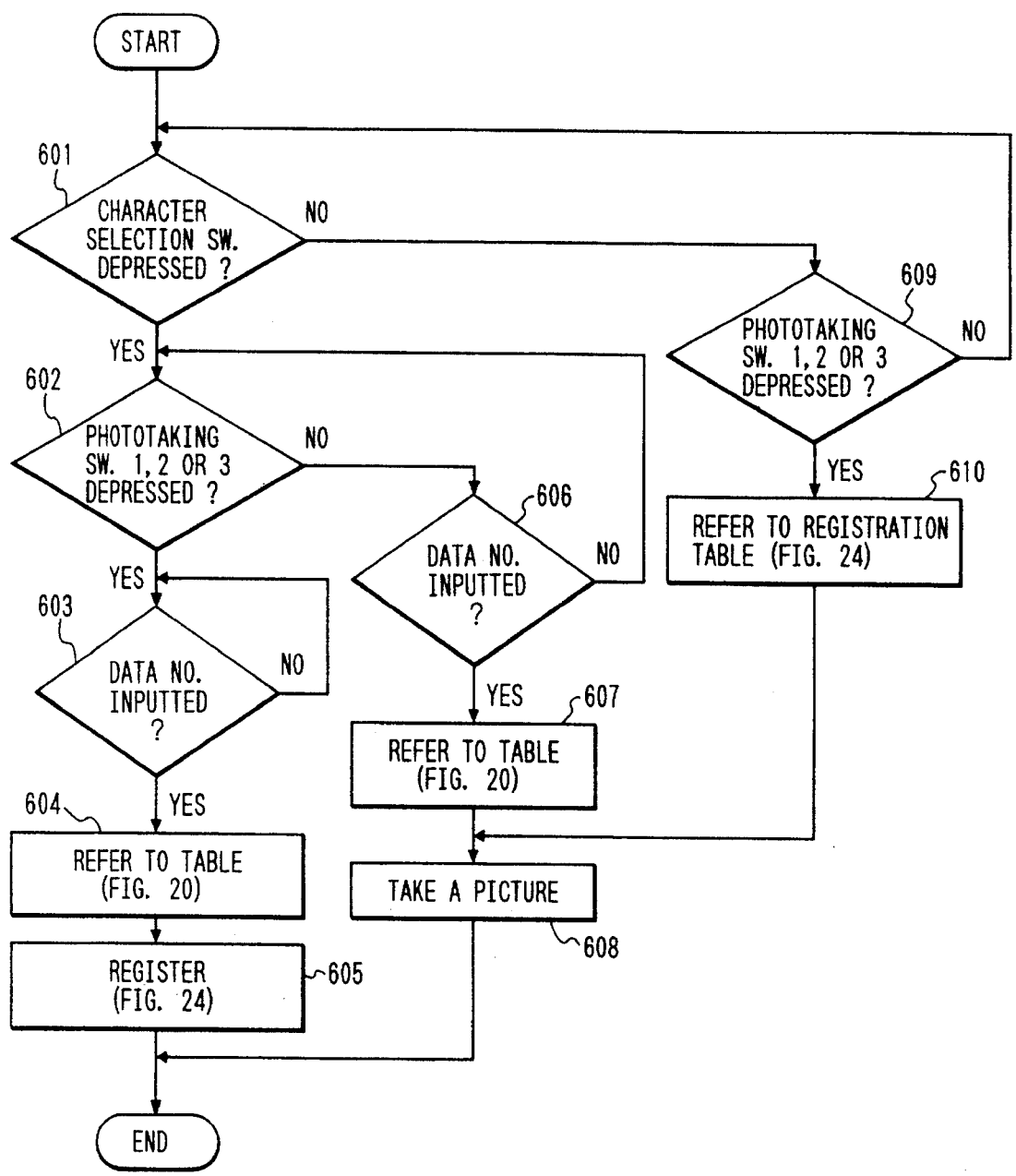
FIG. 23 is a flow chart showing a processing operation of an image recording apparatus according to the fourth embodiment of the present invention.

The processing sequence of the present invention will be described below with reference to the flow chart shown in FIG. 23. Processing for registering selected code information in correspondence with a specific switch (to be referred to as registration processing hereinafter), and processing for photographing selected code information (to be referred to as phototaking processing hereinafter) will be described below in turn.

The registration processing will be described below. It is checked if the character selection switch 552 is depressed (step 601). If it is determined that the character selection switch 552 is depressed, it is checked if one of the phototaking 1, 2, and 3 switches 556 is depressed (step 602). If it is determined that one of the phototaking switches 556 is depressed, the control waits for a data number of code information inputted by the ten-key pad 555 (step 603). At this time, when the data number is inputted, the input data number is displayed on the display unit 553 shown in FIG. 22, and a processing unit 1 reads out code information corresponding to the input data number from the data table shown in FIG. 20 via an arithmetic & transfer unit 4 (step 604). The processing unit 1 registers the readout code information in the registration means of the memory 3 in correspondence with the phototaking switch 556 depressed in step 602 (step 605), thus ending the registration processing.

With this registration processing, registrations shown in the registration table of FIG. 24 are made in the registration means in correspondence with the phototaking 1, 2, and 3 switches 556.

The phototaking processing will be described below. Phototaking processing of a registered code will be explained first. If it is determined that one of the phototaking 1, 2 and 3 switches 556 is depressed (step 609) without detecting depression of the character selection switch 552 in step 601, the arithmetic & transfer unit 4 reads out the code information registered in the registration means of the memory 3 in correspondence with the ON switch 556 (step 610), and the readout code information is photographed onto a microfilm by a character phototaking unit 6 via the arithmetic & transfer unit 4 (step 608). Furthermore, a total phototaking count of the image data at that time is additionally photographed onto the microfilm by the character phototaking unit 6 via the arithmetic & transfer unit 4.

Phototaking processing of the selected code will be described below. If it is determined in step 601 that the character selection switch 552 is depressed, and if a data number is inputted by the ten-key pad 555 (step 606) without detecting depression of the phototaking switch 556 in step 602, the processing unit 1 reads out code information corresponding to the inputted data number from the data table shown in FIG. 20 (step 607), and the readout code information, and a total phototaking count of image data are photographed onto the microfilm by the character phototaking unit 6 by the phototaking processing in step 608.

In this manner, since arbitrary code information selected from a large number of pieces of code information can be photographed, code information according to the content of an image to be photographed or a phototaking condition can be photographed, and it is effective when images are checked or retrieved after the microfilm is developed.

The total phototaking count of image data is photographed in addition to the code information. Therefore, when the developed microfilm is cut into some image groups, the recording contents or phototaking orders of the image groups can be identified based on the total phototaking count of image data, as shown in FIG. 25.

When the total phototaking count of image data is 0 in FIG. 25, the count may be inhibited from being photographed.

As shown in FIG. 26, a value obtained by adding 1 to the total phototaking count may be additionally photographed.

Therefore, the present invention can be very effectively applied to, e.g., a processor camera which feeds and cuts a film by the number of photographed image frames, and develops the cut film frames.

Note that the total phototaking count of image data can be easily reset to 0 by the count reset switch 557 of the operation unit 514. Whether or not the total phototaking count of image data is to be additionally photographed may be selected.

As described above, when code information representing a content of an image group is selected and recorded upon recording of a given amount of images, a total phototaking count of image data at that time is recorded before or after the image group in addition to the code information. Therefore, even when the large number of image groups are cut in units of image groups, the recording order and content of each image group can be easily identified with reference to the code information and the total phototaking count of image data even if there are a plurality of image groups having the same code information, resulting in convenience for retrieval and edit operations.

Since the total image data count at that time is recorded before or after the image data in addition to code information only when code information is photographed, a photographable object size can be maximized, and a decrease in image recording space can be minimized.

Furthermore, since code information is photographed independently of a phototaking operation of image data, an inexpensive apparatus can be provided without decreasing a phototaking speed of image data.

A rotary camera as a phototaking apparatus according to the fifth embodiment of the present invention will be described below with reference to FIGS. 27 to 31.

Figure 27:
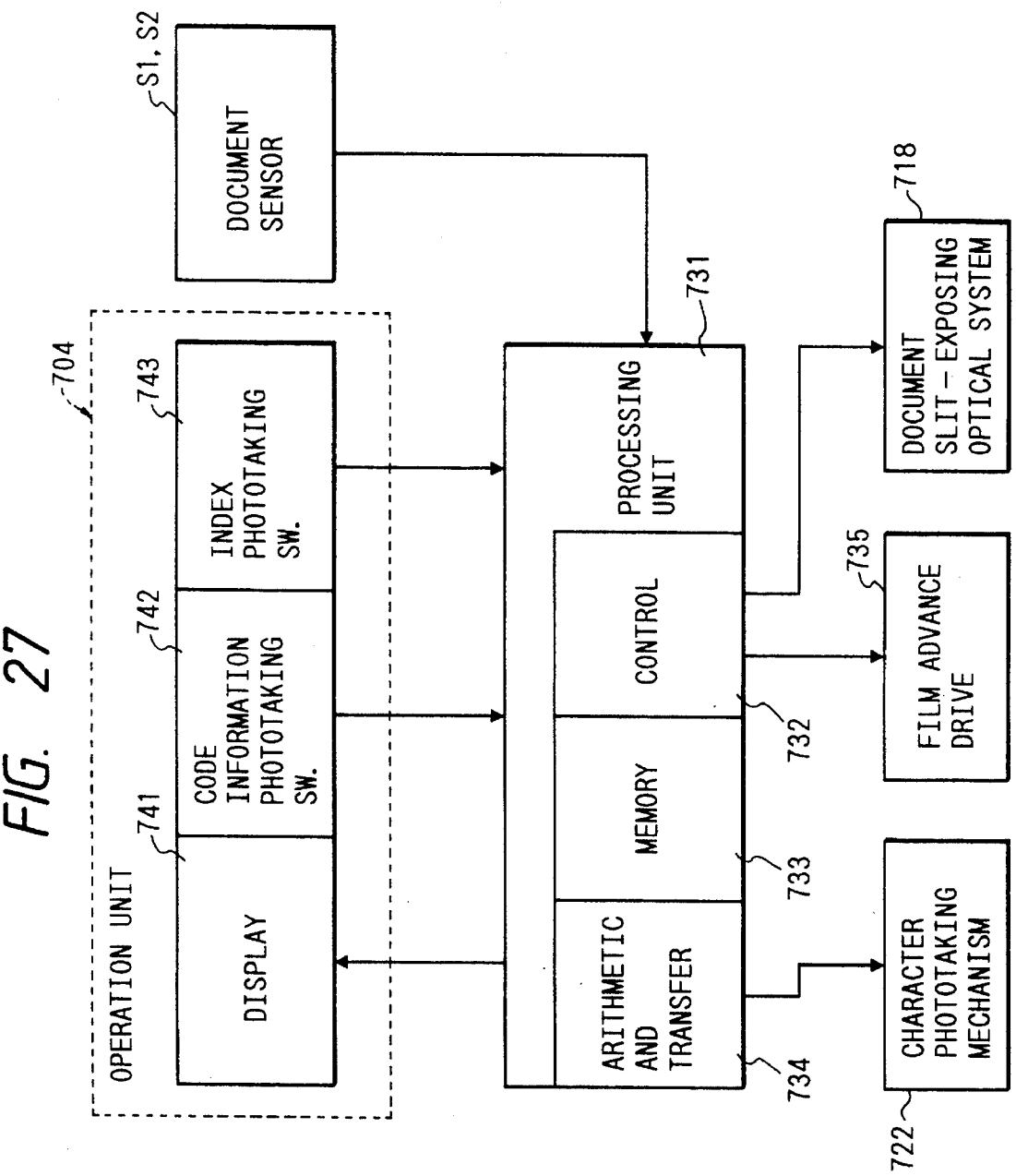
FIG. 27 is a block diagram of a control system in a phototaking apparatus according to the fifth embodiment of the present invention.
Figure 28:
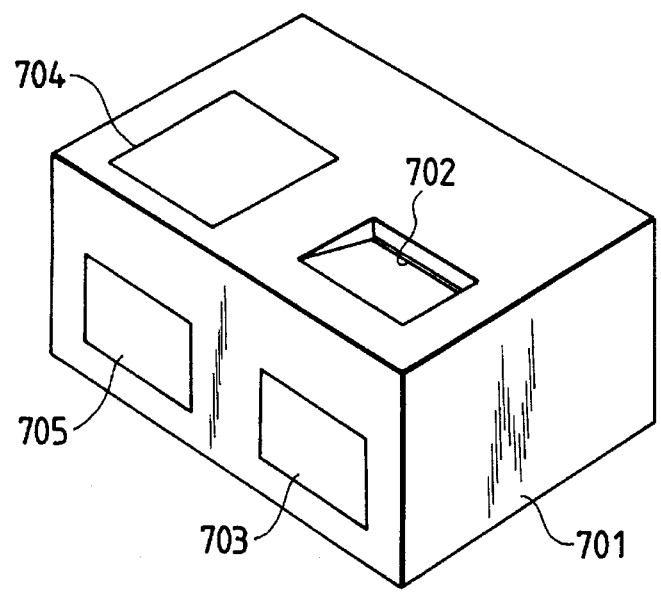
FIG. 28 is a perspective view showing the outer appearance of the phototaking apparatus.
Figure 29:
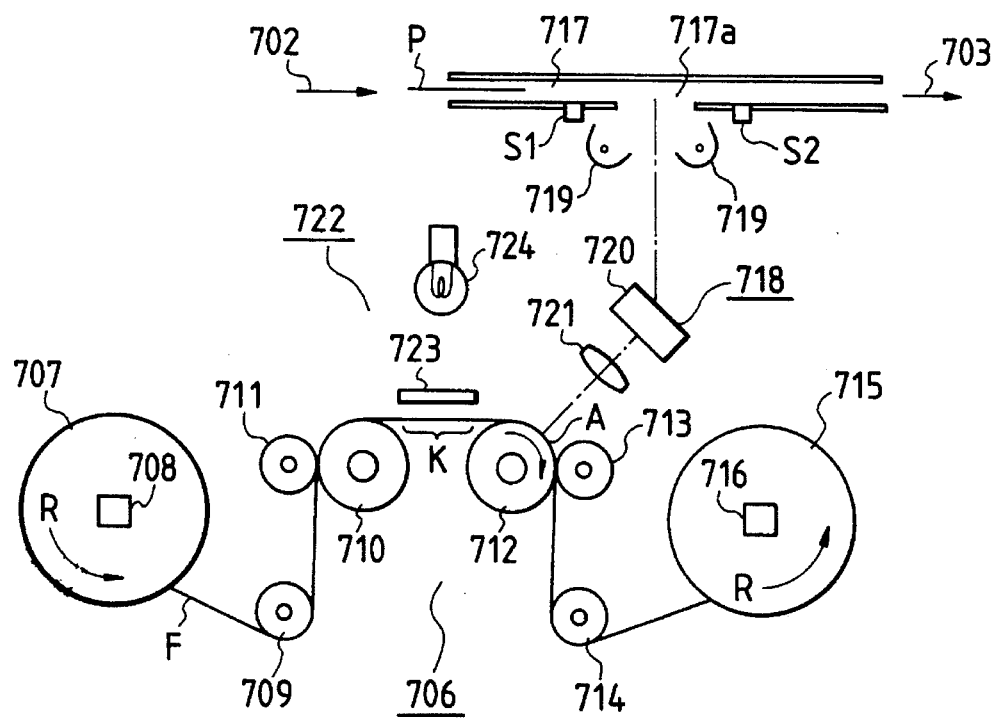
FIG. 29 is a schematic sectional view of an internal phototaking mechanism of the apparatus.

FIG. 27 is a block diagram of a camera control system, FIG. 28 is a perspective view showing the outer appearance of the camera, and FIG. 29 is a schematic view of the internal mechanism of the camera.

In FIG. 28, the apparatus comprises an outer causing 701, an insertion port 702 for inserting a document (object) to be photographed, a photographed document exhaust box 703, an operation unit 704, and a door 705. A film (recording medium) F is loaded or unloaded on or from an internal phototaking mechanism 706 (FIG. 29) by opening the door 705.

In the internal phototaking mechanism 706 shown in FIG. 29, a film supply reel 707 is rotatably supported by a shaft 708, and an elongated film F is wound around the reel 707. A film take-up reel 715 is supported by a shaft 716, and is rotated in a direction of an arrow R upon rotation of the shaft 716 by a drive system (not shown). A first guide roller 709, a second guide roller 710, an idler (pinch roller) 711 which is in contact with the roller 710 under pressure, a capstan roller (film wind-up roller) 712, an idler (pinch roller) 713 which is in contact with the roller 712 under pressure, and a third guide roller 714 are arranged in the order named between the film supply reel 707 and the film take-up reel 715 along a film convey path. The leading end portion of the film F withdrawn from the film supply reel 707 is sequentially guided along these rollers 709 to 714 by a manual operation or an auto-loading operation, and is locked by a core of the film take-up reel 715, thus setting the film.

A document P to be photographed which is introduced into the apparatus from the insertion port 702 is guided along an intra-apparatus convey path 717. A phototaking slit 717a is formed midway along the convey path 717, and a first sensor S1 for detecting that the leading end of the document P to be photographed reaches a position slightly before the slit 717a, and a second sensor S2 for detecting that the trailing end of the document P to be photographed has passed the slit 717a are arranged before and after the slit 717a. A document slit-exposing optical system 718 as an image phototaking means is arranged between the slit 717a, and the capstan roller 712, and comprises a pair of document illumination lamps 719, a mirror 720, a focusing lens 721, and the like. The optical system 718 slit-exposes an image of the document P passing the slit 717a at an exposure position A on the film surface on the capstan roller 712.

A character phototaking mechanism (code information phototaking means) 722 is arranged near a stretched film portion K between the second guide roller 710 and the capstan roller 712, and comprises a transmission-type liquid crystal plate 723, a liquid crystal plate illumination lamp 724, and the like. The character phototaking mechanism 722 photographs code information such as characters, numerals, a date, symbols, or the like on the film F. The above-mentioned arrangement of this embodiment is controlled by a control system shown in the block diagram of FIG. 27. More specifically, in FIG. 27, the operation unit 704 comprises a display unit 741, a code information switch 742, an index phototaking switch 743, and the like. A processing unit 731 comprising, e.g., a microprocessor comprises a control unit 732 for controlling a film advance drive unit 735 and the document slit-exposing optical system 718, a memory 733 for storing photographed code information, and a phototaking order, and an arithmetic & transfer unit 734 for performing these arithmetic operations, and transferring code information to the character phototaking mechanism 722. The processing unit 731 executes processing operations in accordance with input instructions from the first and second sensors S1 and S2, and the operation unit 704.

Figure 30:
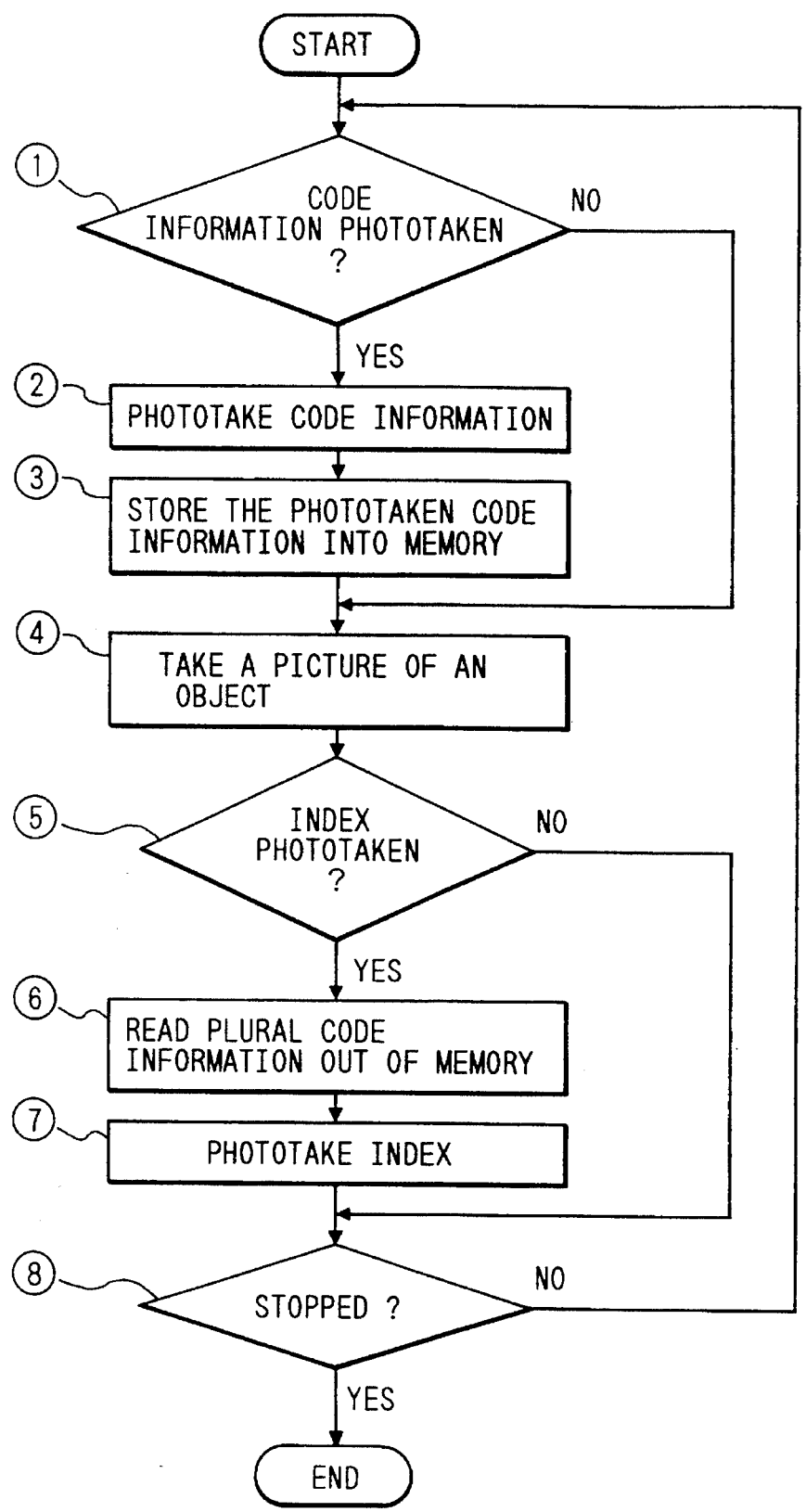
FIG. 30 is a flow chart for explaining an operation of the apparatus.

The operation of the fifth embodiment with the above arrangement will be described below with reference to the flow chart shown in FIG. 30.

When code information is to be phototaken on the film F in step 1 before an image group consisting of a plurality of frame images are photographed, code information corresponding to the image group is photographed in accordance with an input instruction from the code information phototaking switch 742 of the operation unit 704 in step 2, and the photographed code information is stored in the memory 733 in step 3. In step 4, the image group (object) is phototaken. When an index is to be photographed in step 5 after the phototaking operation is completed, the index phototaking switch 743 is depressed. In step 6, all the pieces of code information stored in the memory 733 are read out, and in step 7, an index putting the pieces of readout code information together is photographed by the character phototaking mechanism 722. When a series of desired phototaking operations are completed, the operation is stopped in step 8.

When no code information photographing operation is performed in step 1, an object is photographed in step 4. When no index phototaking operation is performed in step 5, the flow advances to step 8, and when it is determined in step 8 that another phototaking operation is performed, the flow returns to step 1.

Figure 31:
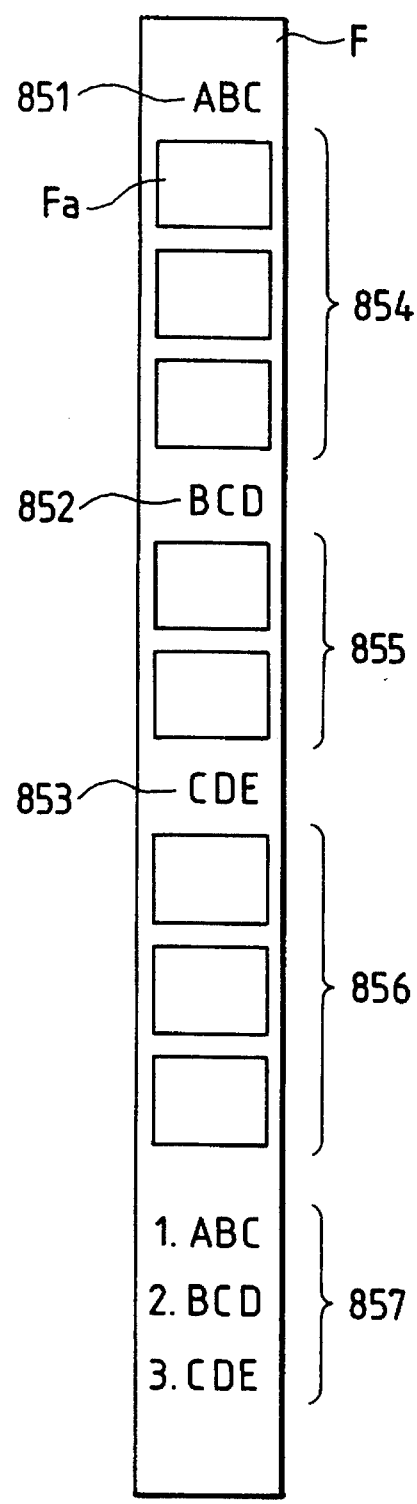
FIG. 31 shows a film formed by the phototaking operation.

FIG. 31 shows an example of the film F formed by the apparatus of this embodiment. Pieces of code information 851, 852, and 853 respectively corresponding to image groups 854, 855, and 856 are phototaken before the image groups 854, 855, and 856 each consisting of a plurality of phototaken frame images Fa, and an index 857 putting these pieces of code information together is photographed after the image group 856. In the index 857, a plurality of pieces of photographed code information may be photographed in the phototaking order. However, it is more effective to phototake the pieces of code information together with numerals indicating the photographing order, as shown in FIG. 31. As numerals indicating the order, numerals of a frame counter, date, or the like may be used instead.

In this embodiment, an index phototaking instruction can be obtained upon depression of the index phototaking switch 743. However, a phototaking end detection means or a film end detection means may be arranged, and the index phototaking instruction may be issued in correspondence with this means.

In this embodiment, as described above, since an index of code information is photographed by utilizing the character phototaking mechanism 722 as the code information phototaking means, an index phototaking function can be added without increasing cost since an index phototaking means need not be added.

Figure 32:
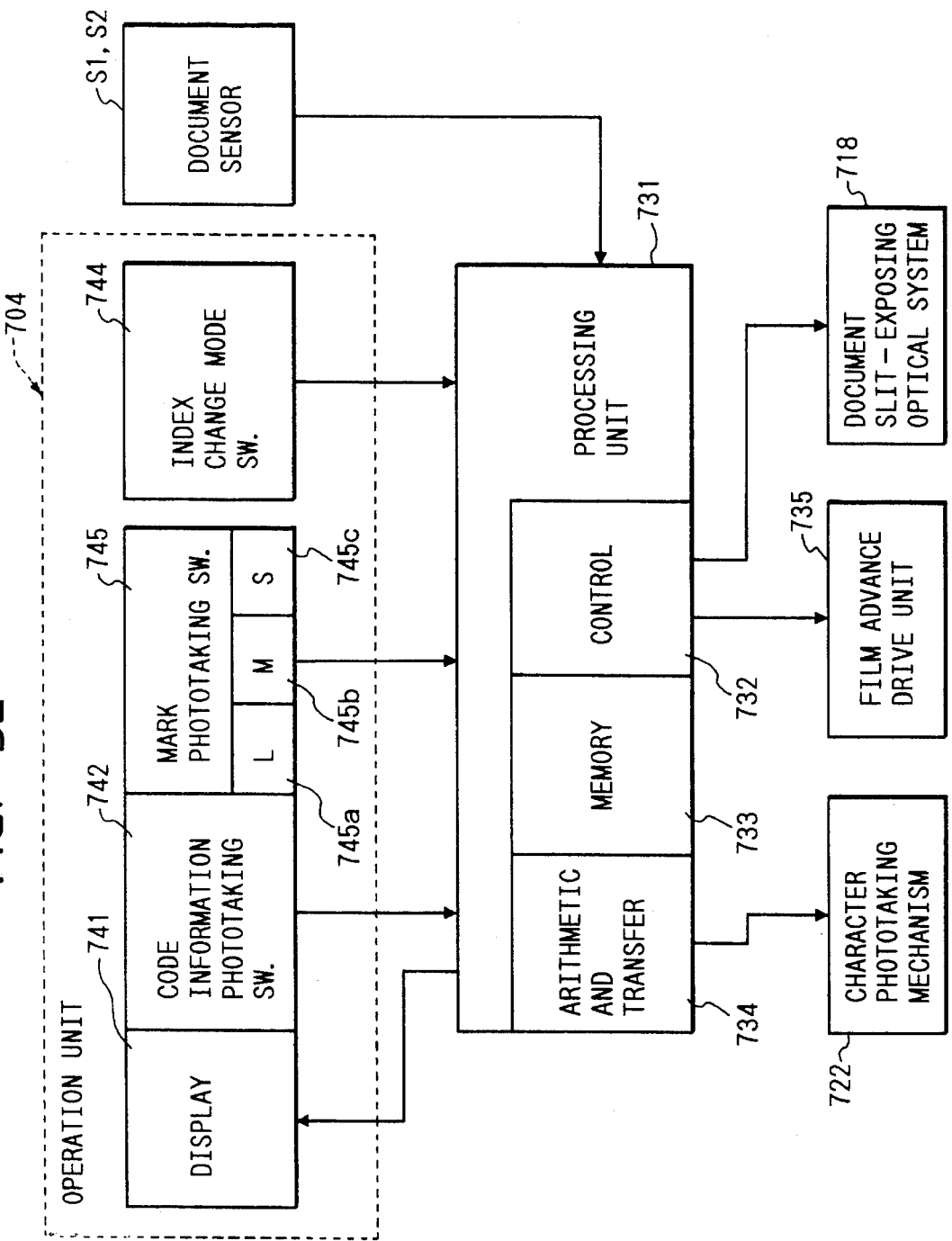
FIG. 32 is a block diagram of a control system in a phototaking apparatus according to the sixth embodiment of the present invention.
Figure 33:
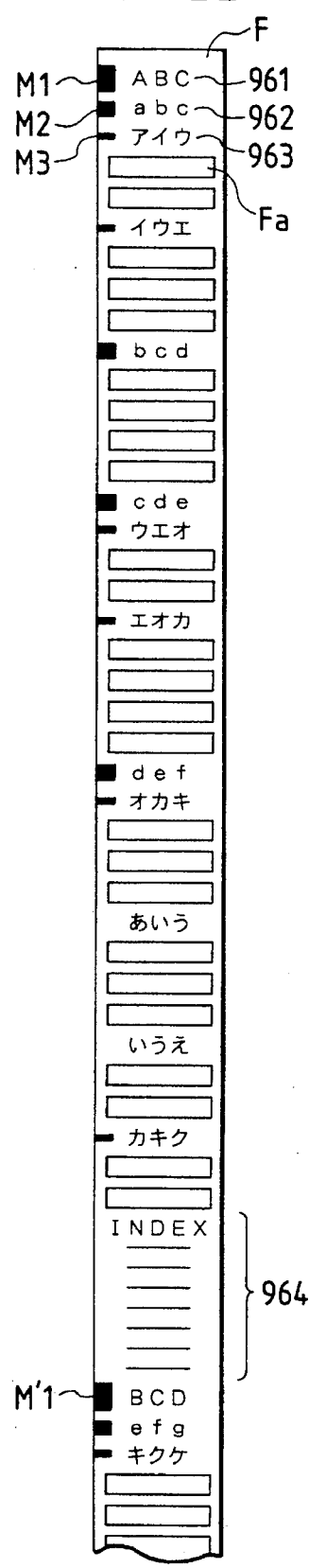
FIG. 33 shows a film formed by the phototaking operation of the apparatus shown in FIG. 32.

FIGS. 32 to 35 show the sixth embodiment of the present invention. FIG. 32 is a block diagram showing a control system of a phototaking apparatus of the sixth embodiment. For the sake of simplicity, the same reference numerals in this embodiment denote the same parts as in the fifth embodiment described above, and only a difference will be described below.

In this embodiment, an operation unit 704 comprises an index mode selection switch 744 in place of the index phototaking switch 743 in the fifth embodiment, and also comprises mark phototaking switches 745 including a large (L) switch 745a, a middle (M) switch 745b, and a small (S) switch 745c. These switches are connected to a processing unit 731. Other arrangements are the same as those in the fifth embodiment. In this embodiment with the above arrangement, a character phototaking mechanism 722 is controlled in accordance with input instructions from the mark phototaking switches 745a, 745b, and 745c so as to photographing three, i.e., large, middle, and small automatic index marks M1, M2, and M3 on one side edge portion of a film F before an image group consisting of a plurality of frame images Fa, as shown in, e.g., FIG. 33, and to photographing pieces of code information 961, 962, and 963 which can be photographed in accordance with an input instruction from a code information phototaking switch 742 on the other side edge portion of the film in arbitrary correspondence with the marks. A memory 733 can store the plurality of photographed marks M1 to M3, the pieces of code information 961 to 963, and the phototaking order. When an input instruction is made from one of the mark phototaking switches 745, e.g., the large mark switch 745a, a plurality of automatically stored code information are simultaneously photographed (index phototaking operation) before the large mark M1 is photographed, thus automatically photographing an index 964.

An arithmetic & transfer unit 734 arbitrarily selects pieces of code information to be photographed as an index from those stored in the memory 733 in accordance with a setting position of the index mode selection switch 744. For example, only pieces of code information corresponding to the large and middle marks can be selected by the unit 734, and can be photographed as an index.

Figure 34:
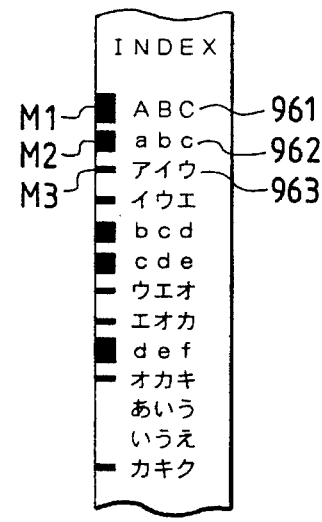
FIGS. 34 and 35 show indices corresponding to the film shown in FIG. 33.
Figure 35:
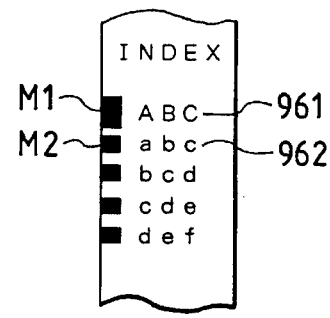

In an example of the phototaken film shown in FIG. 34, all the pieces of stored code information 961 to 963 are photographed as an index upon setting of the index mode selection switch 744. In an example of the photographed film shown in FIG. 35, only pieces of code information 961 and 962 corresponding to the large and middle marks M1 and M2 are photographed as an index.

In this embodiment, as described above, the content of the index can be set in correspondence with the types of mark, and various indices can be provided, thus further improving retrieval efficiency.

As described above, in each of the fifth and sixth embodiments, a phototaking apparatus which comprises an image phototaking means for recording image data on a film by a phototaking operation, and a code phototaking means for photographing unique code information on the film, comprises storage means capable of storing a plurality of pieces of code information photographed by the code phototaking means, and causes the code phototaking means to simultaneously photographed the plurality of pieces of code information stored in the storage means after the end of an image phototaking operation or at an arbitrary timing so that a phototaking order can be identified.

The photographing apparatus may comprise a mark phototaking means for phototaking an automatic index mark on a film, and a storage means for storing a plurality of photographed marks and a plurality of pieces of code information, and may selectively and simultaneously photographed only pieces of code information corresponding to the marks.

The phototaking apparatus may comprise a mark phototaking means, a phototaking end detection means, or a film end detection means, and may obtain a simultaneous phototaking instruction of code information on the basis of information from the mark phototaking means, the phototaking end detection means, or the film end detection means.

As described above, in the phototaking apparatus comprising means for photographing unique code information on a film, pieces of photographed code information and their phototaking order are simultaneously photographed by the code phototaking means as an index, so that an aligning state of image groups can be easily recognized without arranging a special phototaking means, and without increasing cost, thus improving retrieval efficiency.

What is claimed is:

1. An image recording apparatus comprising:

first recording means for sequentially recording an original image comprising a plurality of groups of images on an elongated recording medium;

storage means for storing a plurality of pieces of index information;

selection means for selecting one of the plurality of pieces of index information stored in said storage means;

second recording means for recording on the recording medium the index information selected by said selection means; and count means for counting a number of times that a same index information has been recorded on the recording medium by said second recording means, wherein said second recording means records the index information selected by said selection means and the number of recording times of the selected index information counted by said count means, onto the recording medium, between a region where a first group of images of the original image has been recorded and a region where a second group of images of the original image has been recorded.

2. An image recording apparatus according to claim 1, further comprising:

second count means for determining a number of original images which have been recorded, and wherein said second recording means comprises means for recording the number determined by said second count means on the recording medium.

3. An image recording apparatus according to claim 1, further comprising:

second count means for determining a number of times that the selected piece of index information has been recorded, and wherein said second recording means comprises means for recording the number determined by said second count means on the recording medium.

4. An image recording apparatus according to claim 1, wherein said selection means comprises a plurality of operation switches respectively corresponding to the plurality of pieces of index information, and wherein the selected piece of index information is selected by operating the corresponding operation switch.

5. An image recording apparatus according to claim 1, wherein said index information includes at least one of characters and numerals.

6. A microfilm camera comprising:

first recording means for sequentially recording an original image comprising a plurality of groups of images on an elongated film;

selection means for selecting specific index information from a plurality of index information;

storage means for storing a number of times that a same index information has been selected by said selection means; and second recording means for recording (i) the index information selected by said selection means and (ii) the number of times that the selected index information has been stored by the storage means, onto the film, between a region of the film where a predetermined group of images of the original image has been recorded and a region of the film where a next predetermined group of images of the original image has been recorded.

7. A microfilm camera comprising:

first recording means for sequentially recording an original image on a microfilm;

selection means for selecting specific index information from a plurality of pieces of index information;

storage means for storing each index information selected by said selection means;

instruction means for providing an instruction relating to index information stored in said storage means; and second recording means for recording separately on the microfilm the index information selected by said selection means and for recording together on the microfilm the index information stored in said storage means based on an instruction from said instruction means.

8. A microfilm camera according to claim 7, wherein said first selection means comprises a ten-key pad for selecting specific index information.

9. A microfilm camera according to claim 7, wherein said first selection means comprises a second storage means for storing the plurality of pieces of index information and codes corresponding to respective pieces of index information, wherein the specific index information is selected by selecting the corresponding code.

* * * * *

UNITED STATES PATENT AND TRADEMARK OFFICE
CERTIFICATE OF CORRECTION

PATENT NO. : 5,477,331
DATED : December 19, 1995
INVENTOR(S) : Yukio YAMAGUCHI, et al.

It is certified that error appears in the above-indentified patent and that said Letters Patent is hereby corrected as shown below: Title page,

ITEM [63] - Related U.S. Application Data:

"Aug. 13, 1993," should read --July 13, 1993,--.

ITEM [57] - ABSTRACT:

Line 4, "information" should read --information,--.

COLUMN 1:

Line 6, "08/090,638 filed Aug. 13, 1993," should read --08/090,639 filed July 13, 1993,--;
Line 30, "photograph" should read --photographed--; and
Line 47, "photograph" should read --photographed--.

COLUMN 2:

Line 6, "photographed" should read --phototaking-- and "phototaking" should read --photographed--;
Line 10, "graphs means phototakes" should read --taking means photographs; and
Line 26, "phototaken" should read --photographed--.

COLUMN 4:

Line 55, "frontto-back" should read --front-to-back--.

UNITED STATES PATENT AND TRADEMARK OFFICE
CERTIFICATE OF CORRECTION

PATENT NO. : 5,477,331
DATED : December 19, 1995
INVENTOR(S) : Yukio YAMAGUCHI, et al.

It is certified that error appears in the above-indentified patent and that said Letters Patent is hereby corrected as shown below:

COLUMN 6:

Line 62, "an" should be deleted.

COLUMN 8:

Line 8, "phototaken" should read --photographed--; and
Line 37, "photographen" should read --photographed--.

COLUMN 10:

Line 17, "photographed" should read --phototaking--; and
Line 19, "phototaken." should read --photographed.--.

COLUMN 13:

Line 36, "phototaken on" should read --photographed onto--.

Line 43, "phototaken." should read --photographed.--;
Line 62, "phototaken" should read --photographed--; and,
Line 64, "phototaken" should read --photographed--.

UNITED STATES PATENT AND TRADEMARK OFFICE
CERTIFICATE OF CORRECTION

PATENT NO. : 5,477,331

DATED : December 19, 1995

INVENTOR(S) : Yukio YAMAGUCHI, et al.

It is certified that error appears in the above-indentified patent and that said Letters Patent is hereby corrected as shown below:

COLUMN 14:

Line 2, "phototake" should read --photograph--;
Line 36, "photographing" should read --photograph--;
Line 40, "graphing" should read --graph--; and,
Line 60, "phototaken" should read --photographed--.

COLUMN 15:

Line 13, "photographed" should read --photograph--;
Line 18, "phototaking" should read --photographing--; and,
Line 22, "tographed" should read --tograph--.

Signed and Sealed this

Fourth Day of June, 1996

Attest:

BRUCE LEHMAN

Attesting Officer

Commissioner of Patents and Trademarks